(12) United States Patent
Nguyen et al.

(10) Patent No.: US 6,721,729 B2
(45) Date of Patent: Apr. 13, 2004

(54) METHOD AND APPARATUS FOR ELECTRONIC FILE SEARCH AND COLLECTION

(76) Inventors: Thanh Ngoc Nguyen, 558 N. Wrightwood Dr., Orange, CA (US) 92869; William Norman Morris, Jr., 21512 Camino Papal, Lake Forest, CA (US) 92630; Phu Thien Ngo, 771 S. Lassen Ct., Anaheim, CA (US) 92804

(*) Notice: Subject to any disclaimer, the term of this patent is extended or adjusted under 35 U.S.C. 154(b) by 166 days.

(21) Appl. No.: 09/876,901

(22) Filed: Jun. 11, 2001

(65) Prior Publication Data

US 2002/0023077 A1 Feb. 21, 2002

Related U.S. Application Data

(60) Provisional application No. 60/210,482, filed on Jun. 9, 2000.

(51) Int. Cl.$^7$ .................................. G06F 17/30
(52) U.S. Cl. ...................... 707/3; 707/4; 707/5
(58) Field of Search ................ 707/1, 2, 3, 4, 707/5, 6, 10, 100

(56) References Cited

U.S. PATENT DOCUMENTS

| | | | | |
|---|---|---|---|---|
| 5,321,833 A | | 6/1994 | Chang et al. ............... 395/600 |
| 5,594,837 A | * | 1/1997 | Noyes ........................ 706/55 |
| 5,768,578 A | * | 6/1998 | Kirk et al. .................. 707/100 |
| 5,794,178 A | * | 8/1998 | Caid et al. ..................... 704/9 |
| 5,794,237 A | | 8/1998 | Gore, Jr. ........................ 707/5 |
| 5,806,060 A | * | 9/1998 | Borgida et al. ................ 707/3 |
| 5,809,484 A | | 9/1998 | Mottola et al. ............... 705/38 |
| 5,924,090 A | | 7/1999 | Krellenstein .................. 707/5 |
| 5,974,405 A | * | 10/1999 | McGuinness et al. ......... 706/45 |
| 6,012,053 A | | 1/2000 | Pant et al. ...................... 707/3 |
| 6,052,122 A | | 4/2000 | Sutcliffe et al. ............ 345/331 |
| 6,064,985 A | | 5/2000 | Anderson ..................... 705/36 |

* cited by examiner

*Primary Examiner*—Diane D. Mizrahi
(74) *Attorney, Agent, or Firm*—Patton Boggs LLP

(57) ABSTRACT

A integrated method for searching and reporting the search of electronic data files by receiving a plurality of first and second search concepts from the user, forming the first and second concepts into two-dimensional matrix of paired concepts, performing a search of one or more databases based on all concepts and paired concepts in the matrix, and identifying and displaying a corresponding matrix of search results. An integrated search collection provides formatted documents for drag and drop collection of search information an construction of a search library. An integrated report generation utilizes the format of the collection document for automatic construction of a report.

9 Claims, 12 Drawing Sheets

METHOD AND APPARATUS FOR ELECTRONIC FILE SEARCH AND COLLECTION

U.S. Provisional Application Ser. No. 60/210,482, filed Jun. 9, 2000, is hereby incorporated by reference.

BACKGROUND OF THE INVENTION

1. Field of the Invention

The present invention is directed to a method for searching electronic data files and, more particularly, to a method including the entering of a two-dimensional array of search concepts, each concept being predefined key words and expressions or user-defined key words and expressions, and detecting and displaying a correlation of occurrence, within the electronic data files, between entered concepts in the respective dimensions.

2. Related Art

The amount of information generated, collected, stored, communicated and accessible through the electronic media is continuing to increase. The increase is not only in the volume; it is in the number of sources, and the variety of formats in which the information is communicated and stored. The sources include newspapers, technical journals, government publications, literary works, laws, court opinions, business reports, and public records. More and more of these are being generated, stored, searched, retrieved, and distributed through networked systems of digital computers and other digital document generation and management devices. The migration of these and other sources, and large archives of the same, to electronic media is generally attributed to a combination of the Internet and the increasing number of and capabilities of personal computers (PCs) and other Internet access devices.

The average operator-user with an entry-level PC, a telephone line, and a subscription to an Internet Service Provider (ISP), such as America On Line®, now has access to literally billions of documents, forms, images, and text files, stored throughout the world on a myriad of databases. A large number of the databases are available as free access, to anyone, while others are subscription based or otherwise limited access. There are large databases which, although not directly accessible through the World Wide Web, are available through controlled-access wide area networks (WANs). As known to persons skilled in the relevant art, these may be physically separate from the Internet or may be Virtual Private Networks (VPNs) which coexist on the Internet with public data traffic. Through such private networks an authorized person may have access to large proprietary databases of technical journals, customer profiles, medical records, criminal records, internal memoranda, business reports and the like.

There are continuing problems, though, with searching such a large number of electronic files. Many of these problems prevent users from fully exploiting the Internet, and other wide area networks, and the many databases which these networks make available for their use. One of the problems is the formulation of a search strategy. Search strategy includes the choice of particular features that the user believes, or has otherwise determined, would be contained in, described by, or descriptive of the electronic files relating to the topic that he or she is researching. The choosing of these search features is critical to the research task, yet in most cases it is carried out using nothing more than intuition, trial and error.

Stated more particularly, a typical search of the World Wide Web is as follows: A user accesses the Internet through, for example, an Internet Service Provider such as America On Line®. The user then, using computer software features that are well known in the art, enables a web browser program that resides on his or her personal computer, such as, for example, Microsoft Explorer® or Netscape Navigator®. As is well known in the art, the web browser is usually programmed with a default "home page", which is the Universal Resource Locator ("URL") of a specific web site. The web browser then performs the required Hypertext Transfer Protocol ("HTTP") communications with the web server hosting the home page.

The home page may be hosted by a commercial web services/advertising entity, such as Microsoft Network®, Excite®, and Yahoo®. Such commercial home pages generally have one or more icons representing search engines, both their own and those of third parties such as Lycos® and Infobot®. When the user clicks on the search engine, he or she is presented with a display page typically having a field for entering the search query terms, also referenced in the art as "key words".

The typical user then proceeds to enter the key words. Many commercially available Internet search engines provide Boolean connectors of AND, OR and NOT for connecting the key words. Boolean searching ideally identifies all documents containing the defined connection of string of "key words". This may be with or without further limitations, such as year, language, publisher, and other type characteristics. Some of the sophisticated Boolean search methods permit the user to define search terms to include not only the term itself, but also the synonyms of, and the ranges around the term. There are available search engines that have the ability to group key words according to parenthesis. This permits more complex Boolean expressions.

The entry field, though, forms the key words into a one-line expression, regardless of the number of terms. Therefore, in that one line expression, the user is attempting to formulate a single Boolean expression that will, based only on his or her intuitive sense, have a "feels OK" likelihood of finding relevant files, i.e., "hits", but is not so broad that it retrieves an unwieldy number.

In a typical scenario of Boolean searching, however, the user would not simply formulate a single expression, and then conduct the entire search using only that expression. Instead, the process is typically as follows: The user attempts a first Boolean expression and gets a number of "hits". If the number of hits is zero the user will usually vary the expression, either by removing one of the AND operators and thus lowering the criteria required for a document to qualify as a hit, or by substituting a synonym for one or more of the search terms. If the number is too high the user may retrieve, by one of the known methods, a sample set of the "hits" and read them to identify his or her next strategy. Most often the user will simply add further search criteria, typically by connecting another key word to the original Boolean phrase by an AND operator, and then run another search. When the process is completed, which is frequently coincident with the point where the user runs out of time, the typical user will have attempted a generally random sequence of different Boolean expressions, and many variations on each. The user has, hopefully at least, laboriously retrieved and reviewed documents obtained from each search expression and, in a method that is typically unique to each user, has collected and combined these into, for example, a research report.

There are numerous problems with this method. One major problem is that the user is attempting to find an optimal search phrase, using the number of "hits" resulting from each attempt compared to the previous attempt as the sole heuristic. For example, assume that a user is writing a paper on trends in the number of children who are transported to and from school by busses as compared to the number who are transported by parents or guardians. Assume that the first Boolean phrase that the person uses is the previous example of (CHILD OR KIDS) AND (BUS OR ("PUBLIC TRANSPORTATION")). Assume that the user is searching the Internet, using known methods of Internet access. If the number of hits is too high the user will add another search term. An example would be PERCENTAGE TRANSPORTED. The typical user would then run the search again and see the number of hits. After a number of iterations the user would finally obtain an acceptable number of hits, for example thirty.

The search "methodology" described above has other shortcomings. One is that the user might not record the various search Boolean phrases that were attempted before he or she finds the phrase that yields the desired thirty hits. As a result the user might run the same search twice, or might forget to try all possible substitutions of terms. Another problem, which is more fundamental, is that the search phrase that the user ended up with might not be the only search phrase that obtains thirty hits, and, of those phrases, it might not be the best one.

Still another problem, which overlays all of the previously identified problems, is that some users are better than others at formulating search expressions. This creates a statistical variance in the "quality" of searches, both in terms of time and coverage, which may itself be a problem, especially within certain institutions and professions.

Another problem with a "methodology" for Boolean searching such as the example above is that the user may not have fully defined or developed the topic of the paper before starting the research. As is well known among, for example, college students, the user frequently starts the search before fully identifying the topic, scope, or conclusion of the task for which the search is being conducted. The user then picks the topic, and composes the outline of the paper, or other reporting document, after sifting through the results obtained from his or her repeated searches with different Boolean expressions. However, in using the "trial and error" method of attempting numerous Boolean expressions to see which one provides results that inspire the user, the user may frequently overlook many Boolean expressions for which the search results would reveal more interesting or valuable topics.

Yet another problem with the prior art of searching using single-line Boolean expressions is that many users cannot easily generate or store an understandable description of, or history of, the overall search strategies that were employed when he or she conducted a search. Therefore, frequently the user will run what is basically the same search twice, or will recreate the search strategy each time a particular project is picked up again or a new research project is undertaken.

Still another problem is that after trying multiple Boolean phrases and obtaining and relying on the results obtained with one or more of the searches, the user may have difficulty ascertaining or defending the quality of the search. This is the problem that may be encountered by students, as well as consultants and analysts when having to defend the facts, analysis or conclusion presented in a final paper based on research results.

SUMMARY OF THE INVENTION

The present invention provides a structured, concept-exhaustive method for searching databases for documents and other electronic files by receiving a plurality of search concepts from the user, designating a first plurality of the search concepts as a first search vector defining a first dimension of the matrix, and designating a second plurality of the search concepts as a second search vector defining a second dimension of the matrix. The method then performs a search of one or more databases based on the matrix, and identifies a plurality of search results, each represented by a cell of the matrix. A row of the matrix is formed by a row of cells reflecting, on a one to one basis, a search result for each of the plurality of search concepts within the first search vector. A column of the matrix is formed by a column of cells reflecting, on a one to one basis, a search result for each of the plurality of search concepts within the second search vector. Other cells of the matrix reflect, on a one to one basis, a search result for each unique pair comprising a search concept from among said first plurality of search concepts and a search concept from among said second plurality of search concepts.

A further embodiment of the invention presents the user with a visual display arranging the first plurality of search concepts as a border column, and the second plurality of search concepts as a border row. Each cell within the border is in a row-column position corresponding to a pair of search concepts, one being from the first plurality of search concepts and one being from the second plurality of search concepts. The step of displaying the search results forms each cell to have a visual state reflecting the search result for the search concept or pair of search concepts corresponding to that cell.

A still further embodiment of the invention includes a step of displaying the matrix of cells to appear as a two-dimensional plane, and displaying the search results to appear as a third dimension.

A further embodiment of the invention includes a step of receiving a search concept definition command from a user, and defining one or more of the plurality of search concepts in accordance with the received search concept definition command.

Another embodiment of the invention may be combined with any of the previously identified embodiments, and comprises the further step of receiving a user-entered cell selection command, presenting the user with a cell result list identifying documents and other electronic files within the search results reflected by the selected cell. This embodiment optionally includes a further step of receiving a document selection command from the user and a step of displaying information reflecting information content of a document or other electronic file selected in accordance with the document selection command. This embodiment optionally includes a further feature of simultaneously displaying the received cell selection command, the cell result list, a data reflecting the document selection command, and the information reflecting information content.

A further embodiment of the invention may be combined with any of the previously defined embodiments of matrix searching in accordance with the present invention, and includes the further steps of receiving a collection document command from the user, and generating a collection document in response, receiving a document selection command from the user, displaying a document or other electronic file in response, receiving a portion storage command, and copying of information into the collection document from a portion of the displayed document corresponding to the portion storage command.

A still further embodiment of the invention includes an organizing step which may be combined with any of the previously defined matrix searching with collection embodiments, and includes the further steps of receiving a user-entered document tag data, and storing an information into the collection document corresponding to the received document tag data and a portion of the displayed document corresponding to the portion storage command. An optional feature of this embodiment includes a user-entered relational database information data with the document tag data. A further optional feature of this embodiment includes steps of receiving a collection document store command from the user, and storing the collection document into a collection database in response, and repeating the step of matrix searching to including searching the collection database.

A further embodiment of the invention includes a reporting step which may be combined with any of the previously defined matrix searching with collection and organizing embodiments, and includes the further steps of receiving a user-entered link analysis generation command, identifying information contained in the search result documents that is common between two or more search concepts, and generating a link document having a link information reflecting the information identified as common. An optional feature of this embodiment includes a step of generating a graphical link chart showing the link information.

A still further embodiment of this invention comprises any of the previously defined embodiments combined with a step of drill down matrix searching, the drill down matrix searching comprising the step of receiving a cell search command from the user, receiving a new plurality of search concepts from the user, the receiving including entering or designating a first plurality of the new search concepts as a first search vector defining a first dimension of a new matrix, and entering or designating a second plurality of the new search concepts as a second search vector defining a second dimension of the new matrix. This embodiment then searches, based on the new matrix, the documents and other electronic files represented in the search results within a cell corresponding to the received cell search command.

These and other objects, features and advantages of the present invention will become more apparent to, and better understood by, those skilled in the relevant art from the following more detailed description of the preferred embodiments of the invention taken with reference to the accompanying drawings, in which like features are identified by like reference numerals.

DETAILED DESCRIPTION OF THE INVENTION

A method for a structured, but flexible search using an integrated graphical user interface for entering a user-specified matrix of both pre-defined and user-defined search concepts, performing a complete and exhaustive search, presenting the user with a comprehensive overview of the search statistics corresponding to the matrix of concepts, and with information from documents relating to selected search concept, and quickly linking the user to the search documents from the integrated graphical user will be described. Also described are additional features and embodiments, including analyzing the results of the search in relation to the search matrix, collecting the search results with assistance of a display of the search matrix, organizing the collected search results by receiving tag and relational database data from the user and merging that data with the collected search results, and generating a link report identifying and showing linkages between search concepts reflected by information in the search results.

The following description includes numerous example details and specifics which pertain only to the specific examples presented herein, and are included only to assist in describing these specific examples, and thus assist the reader in understanding through example the features and elements of the present invention. It will be evident to ones skilled in the art that the invention can be practiced without, and with different ones of, these details and specifics. Further, this description assumes an ordinary skill in the art of conventional Boolean and other commercially available search engines, known, standard network and database structures and interface protocols, and conventional programming in, for example, Visual Basic®, C++, or Java®, running under, for example, Microsoft Windows 95®, Microsoft Windows NT®, Linux, Sun Solaris®, or Apple OSX®, or other equivalent commercially available operating systems.

Figure 1:
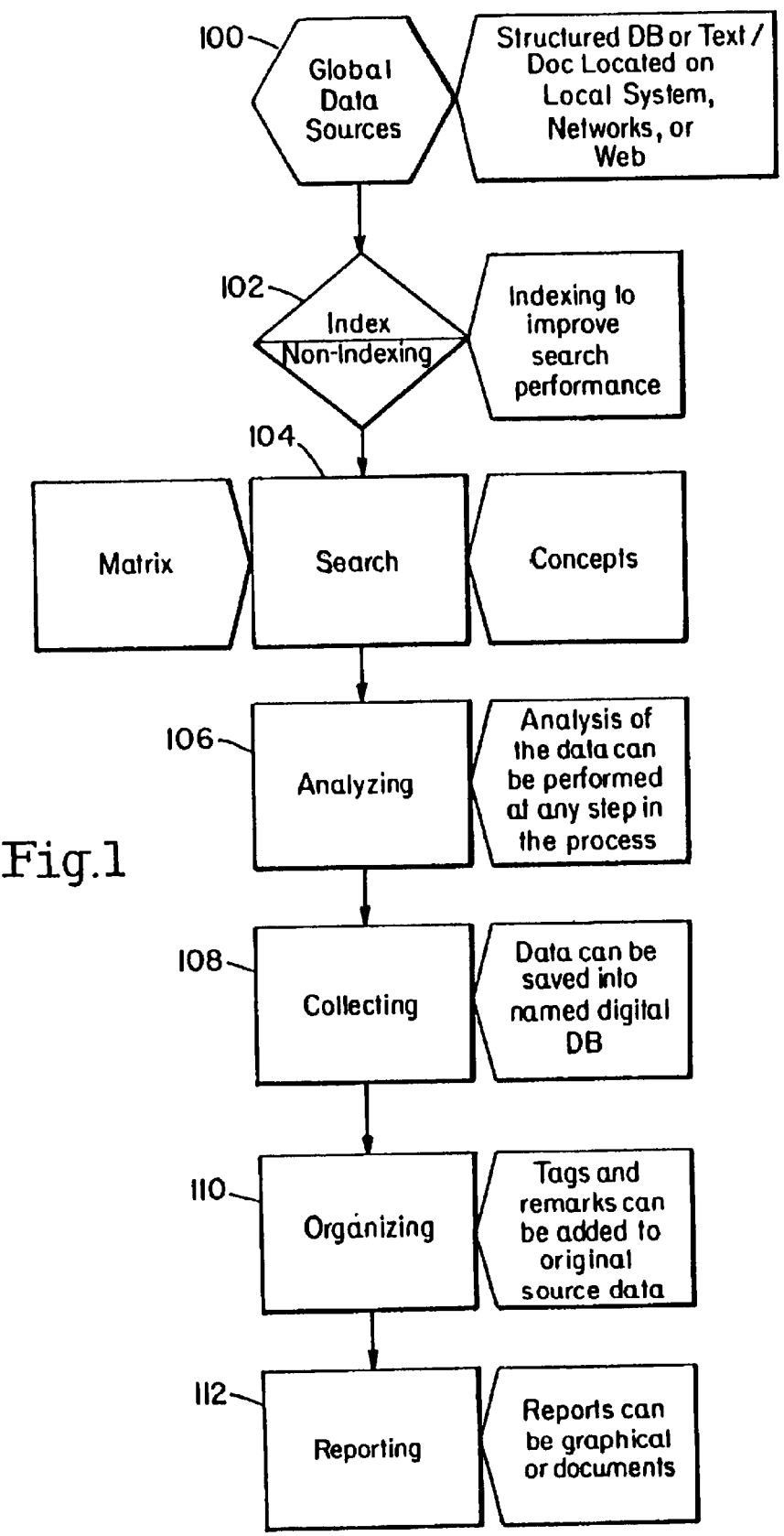
FIG. 1 is an example high level functional flow chart of a method according to the present invention.

FIG. 1 shows a high level functional flow chart of a preferred embodiment of the invention. It will be understood that FIG. 1 is not a limitation on the invention, and that the function and novelty of the invention does not depend on all of depicted functional blocks being present. Instead, the invention can be practiced and its benefits over the existing art obtained using only a subset of the depicted number of functional blocks, as will be better understood upon reading this description in view of the accompanying drawings. Further, the particular segmentation and labeling of FIG. 1 is not a limitation on the particular software coding scheme or software module structure for implementing the invention. As will be understood by persons of ordinary skill in the arts relating to this invention, the described invention can be readily implemented with a segmentation, arrangement and labeling of functional blocks differing from the example shown in FIG. 1.

Referring to the example flow chart of FIG. 1, user first selects, at block 100, one or more global data sources "GDS". Global data sources, or GDS, is defined herein as the universe of databases which the user wishes to search. In the example described here, step 100 is where the user selects the database that he or she will search. It is assumed that a system setup has made the databases available to the user, according to computer and database set-up procedures well known to persons of ordinary skill in the art relating to this invention. For example, if the World Wide Web, or other Internet-related database resource or networked database is among those that can be selected by the user, then the user's computer (not shown) will typically have an Internet web browser, such as Microsoft Internet Explorer®, and the user's computer will typically be connected via modem to an Internet Service Provider, such as America On Line.

For purposes of this description, "database" means any stored collection or aggregation of digital information, which may be arranged in and according to any of the various formats known in the art including, for example, records, tables, word processing documents, text documents, sound files, and image files. These digital information formats are collectively referenced herein as "electronic files". The databases selected at step 100 may be in accordance with any of the structures known in the art. It is assumed that the person of ordinary skill in the arts relating to this invention has a working knowledge of the available database structures and, therefore, a detailed description of database theory is not necessary for an understanding of this invention.

For purposes of example, the World Wide Web is one of the databases GDS which may be selected at step 100. As known in the art, the "database" embodied in the World Wide Web comprises more than one billion electronic files, which are "posted" by storing them within one or more web servers (not shown) that are connected to and accessible through the Internet. Each posted file is addressed, and accessed, by its Uniform Resource Locator (URL) value. Electronic files posted in this manner are generally referenced as "web documents". Business entities such as Google® and Yahoo® maintain an index of some, but not all, of the publicly available web documents. As will be described in more detail with respect to the indexing step 102, some of the web documents' index entries include key words and other file description data characterizing the web document.

For purposes of example, another type of database known in the art which may be selected at step 100 for searching stores electronic files in a name table having, for each file, addressable locations within a storage media identifying where the file is stored. Example storage media includes a magnetic disc storage unit, an optical disc storage unit, a solid state storage unit, or networks thereof. Commercially available products, methods and protocols of this type of database are well known in the art.

Still another type of database which may be searched in accordance with this invention, and thus selected at step 100, is the "relational database". The term "relational database" is defined herein in accordance with its established meaning in the relevant art. An example of a relational database is Microsoft Access®.

The GDS databases selected at step 100 may include publicly accessible web documents which, although posted, do not have their URLs listed by well-known entities such as Yahoo® and Google®. Further, the selected GDS databases may be databases for which the documents themselves are not "posted" but, instead, have a posted web document which is an index of that database. As known in the art, search engines may access such an index, either directly or indirectly through the indexes posted by entities such as Yahoo® and Google®, and obtain "hits" referencing the user to the home page of the database. Typically, as known in the art, the user then accesses the specific documents using another search engine featured on that home page.

Still other databases selected at step 100 may include, depending on particular system access privileges that the user possesses, controlled access databases owned or controlled, for example, by business entities such as banks, insurance companies, and medical institutions, or by government entities. The specific structures and protocols of such controlled access databases, as well as the hardware and software resources for maintaining them, are known to one of ordinary skill in the arts relating to this invention, can be readily interfaced with the method of the present invention, and therefore description is omitted.

Figure 2:
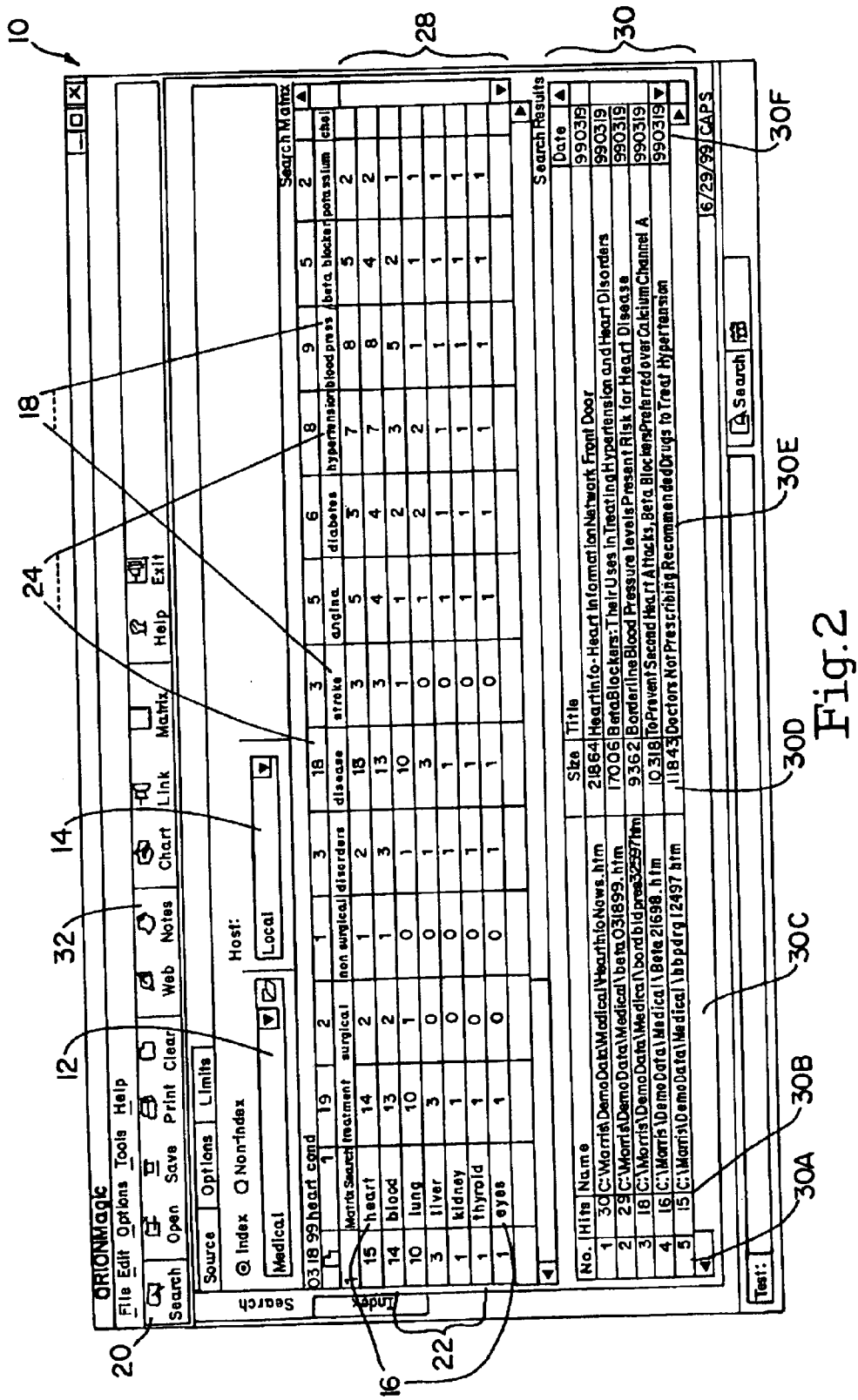
FIG. 2 shows an example graphical user interface display of a search matrix in accordance with the method of the present invention.

The particular user interface by which the user selects databases at step 100 is a design choice readily implemented by one of ordinary skill in the arts pertaining to this invention. An example is shown in FIG. 2, which is an example graphical user interface for performing the search step 104 described below. Referring to FIG. 2, the depicted example graphical user interface 10 has a data entry field 12 into which the user enters the name of the GDS databases selected at step 100. As discussed in reference to the indexing step 102 below, the user can enter an index name into field 12 instead of a database name. In fact, the example search shown in FIG. 3 searches an index, which is named "Medical".

Referring again to FIG. 2, a further option in the graphical user interface 10 is a field 14 for the user to specify a higher level domain in which the GDS database is found. The FIG. 2 example graphical user interface 10 shows the field 14 having a domain labeled "local". Referring to the FIG. 2 example, the "local" domain identifier in field 14 informs the user's database access computer (not shown) that the "Medical" database index is local to the computer. As known to ones skilled in the relevant arts, the meaning of "local" is determined by the particular computer and operating system on which the invention is being practiced. For example, as known to ones skilled in the relevant arts, within a computer system running under the Windows 95® or NT® operating system, "local" can be defined as one or more hard drives (not shown) or other storage media connected directly to the computer, or shared by multiple computers connected by a LAN (not shown) to one or more servers (not shown).

It will be understood that a plurality of GDS names or identifiers may be entered into, for example, field 12 of the graphical user interface 10 of FIG. 2.

It will also be understood that step 100 may be omitted, and the invention practiced with, or with the user being limited to, default databases. Further, it will be understood that step 100 may be an automatic selection process, using a computer program readily composed by one of ordinary skill in the art for selecting one or more GDS databases in accordance with the subject matter searched.

After the user selects the GDS databases for searching at step 100, or as an optional first step if the selection step 100 is omitted, the user may employ step 102 to pre-index the databases to be searched. The pre-indexing step 102 is not required for practicing the method of this invention. However, as known in the relevant arts, query searching for files meeting a criteria is typically much faster if it is performed, at least in part, on an index of the files instead of the actual content. The general reasons are well known, and include the fact that, typically, index files are typically much shorter than the full text files that they characterize, and that index files are typically formatted so that specific information is in specific fields. However, as is also known in the art, there are typical shortcomings with index-based searching. These include the fact that the ultimate coverage and accuracy of the search depends, in part, on the accuracy of the index.

The specific types and methods of indexing performed at step 102 are in accordance with any of the indexing schemes known in the relevant arts. Step 102 may, for example, process each file or document in the selected databases GDS and generate a key word or key feature profile record corresponding to that file. As known in the art, the World Wide Web uses this type of indexing. More particularly, entities such as Google® and Yahoo®, maintain indexes based on the web documents being in the Hypertext Markup Language (HTML) format, which has metatags within the document itself describing its features. The indexes maintained by entities such as Google® and Yahoo® typically correspond to, or contain, these HTML metatags of the title, summary description, and key words. Further, the file description data may be provided by the person or business entity that owns the web document. In addition, services such as Google® and Yahoo® may send, typically via the Internet, a file extraction program, frequently referenced in the art as a "spider", to extract additional data for creating the index.

Notwithstanding the indexes maintained by business entities such as Yahoo® and Google®, step 102 may index the World Wide Web using the above methods. Methods for generating indexes of the World Wide Web are well known in the art and are therefore not described here. As known in the art, such indexing is a substantial task requiring considerable resources, although there may be reasons for step 102 to generate such an index. Consideration of these must, as known to persons skilled in the art, be in view of the particular objectives and resources of the user. For example, it is well known that many commercial World Wide Web indexes are typically incomplete and have inconsistent accuracy. In addition, such indexes are generally formatted for interfacing with the entities' own search query engines. Therefore step 102 may include generation of a customized World Wide Web index, additional to those available through Yahoo®, Google® or even Altavista®.

Typically, however, the GDS databases that the user would select for indexing at step 102 would be ones other than the World Wide Web. There are numerous indexing schemes, methods, and numerous products for performing the same, which are well known in the arts relating to this invention. The specific indexing schemes and methods employed at step 102 would, as is known to persons skilled in the art of database management, is a design choice and would be selected and/or written based on factors including the storage capacity of the processing resources hosting the database(s) and the search performance desired by the user. One example that is widely available is the commercial database management and indexing program sold as Veritas®.

Figure 3:
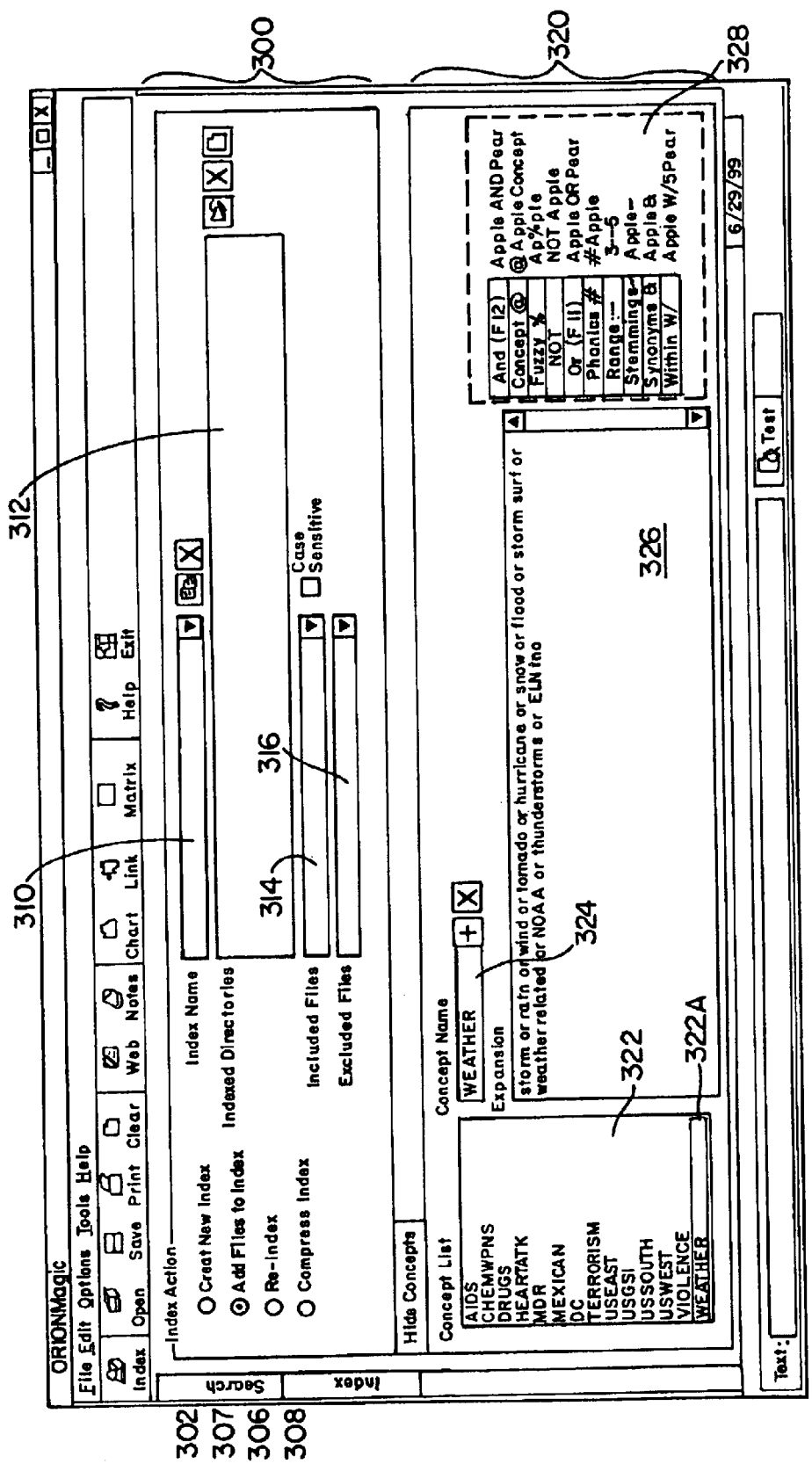
FIG. 3 shows an example graphical user interface of an indexing step and concept definition step in accordance with the method of the present invention.

Referring to FIG. 3, in a preferred embodiment of the invention the indexing step 102 is carried out by generating a graphical user interface display such as the depicted window labeled INDEX having a field area 300. The INDEX field area 300 is for designating the indexing operations including, for example, Create New Index field 302, Add Files to Index 304, Re-index 306, and Compress Index 308. The FIG. 3 INDEX graphical user interface further includes a field 310 for the user to enter a name for the index, a field 312 for the user to enter the name of the directories to be indexed, a field 314 for the user to enter the names of the folders within the director(ies) entered in the field 312 to be indexed, and a field 316 for the user to enter the names of folders to be excluded from the indexing operation.

The FIG. 3 graphical user interface 300 is for purposes of example only, as the design of graphical user interfaces for selecting the files or databases to be indexed is a design choice, readily constructed by one of ordinary skill in the art of computer programming. One typical graphical user interface for an indexing that could be incorporated and used at step 102 is that shown by the Microsoft Explorer® feature of the Windows 95® operating system.

As known to persons skilled in the arts relating to this invention, database indexes such as those generated at step 102 are typically not updated each time that the indexed databases are searched. Depending on the size of the database, and the level of the index, such updating may require substantial time, and may render the database inaccessible or lessen the access performance while the process is ongoing. The database index is therefore, typically updated periodically, or in response to a specific command entered by the user. The criteria for determining the frequency of updating the index are known to persons skilled in the arts relating to this invention and, therefore, description is omitted.

Referring to FIG. 2, which is an example graphical user interface for performing the search step 104 described below, the indexing step 102 stores the index in a file (not shown), and the user can scroll through this as shown in the FIG. 2 field 12. The specific example index shown in field 12 of FIG. 2 is named "Medical".

As stated above, the indexing step 102 is not required for practicing this invention. The search step 104 can search indexes created by others, such as the Yahoo®, Google® and Altavista® indexes. Search step 104 can search non-indexed GDS databases. Search of non-indexed databases is performed in a manner comparable, in part, to the methods used by existing query-based search engines to search non-indexed files. More specifically, as known in the art, such searches typically examine database files one at a time, scanning for the query search terms. As is also known in the art, such searches typically require considerably greater time than indexed searches.

Referring to the example flow chart of FIG. 1, after selecting a GDS database at step 100 and indexing one or more of the selected databases at step 102, or as a first step if these steps are omitted or established as a default, the method of this invention performs the search step 104. As will be described, search step 104 comprises receiving a plurality of user-entered search query terms, which are labeled for reference as CONCEPTS, and assigning or arranging the CONCEPTS into two sub-pluralities, which will be referenced as ROW CONCEPTS and COLUMN CONCEPTS. As will be further described, the CONCEPTS search query terms may be pre-defined, such as words of the English language, or may be defined by the user as will be described in greater detail below.

Referring to the example graphical user interface shown in FIG. 2, step 104 arranges or assigns a first plurality of the received CONCEPTS into a first set of M CONCEPTS, which are labeled herein for reference as ROW CONCEPTS (i), the index "i" ranging from i=1 to M, with an example set shown in field 16 of the figure. The step further arranges or assigns a second plurality of the received CONCEPTS into a second set of N CONCEPTS, which are labeled herein for reference as COLUMN CONCEPTS (j), the index "j" ranging from j=1 to N, with examples shown in field 18 of the figure. The arrangement or assignment of CONCEPTS as ROW CONCEPTS and COLUMN CONCEPTS is by user choice.

It will be understood that the above reference labels of COLUMN CONCEPTS and ROW CONCEPTS, their respective indices "i" and "j", and the population labels of "M" and "N" are merely for consistency of reference in describing the method of this invention. These labels and indices are not a limitation on the present method, as persons of ordinary skill in the computer arts relating to this invention can readily identify, upon reading the instant description, many alternative label and indexing schemes for practicing the inventive method described herein.

Referring to the example graphical user interface shown in FIG. 2, after the user has entered the desired M+N CONCEPTs, in two sets arranged, for example, as the ROW CONCEPTs(i), i=1 to M, and COLUMN CONCEPTs(j), j=1 to N, the user clicks on field 20, which is labeled "Search". In response, step 104 performs M query searches, one for each ROW CONCEPT(i), of the GDS database or database index identified in field 12 and, for each search, identifies all data files having a predetermined type of occurrence of a word or phrase that is within the definition of that ROW CONCEPT. For purposes of this example "predetermined type of occurrence" means an occurrence anywhere in the document. Step 104 also performs N query searches, one for each COLUMN CONCEPT(j) and identifies all such data files having an occurrence of a word or phrase that is within the definition of that COLUMN CONCEPT.

For each ROW CONCEPT(i) and COLUMN CONCEPT (j) searched, step 104 generates a HITS record, labeled for reference herein as HITS(ROW CONCEPT(i)) and HITS (COLUMN CONCEPT(j)). The HITS records include a K number, which equals the number of documents in the record. The K number is referenced herein as K(ROW CONCEPT(i)) and K(COLUMN CONCEPT(j)). The labels of ROW CONCEPT and COLUMN CONCEPT are for purposes of reference only, as each is a CONCEPT as defined herein. As will be understood, the assignment of ROW CONCEPTS and COLUMN CONCEPTS is a label for describing operation of separating the user-input CONCEPTS into two groups, searching each member of each group individually, and then forming all possible pairs of ROW CONCEPT with a COLUMN CONCEPT, the pair being referenced as a PAIR CONCEPT(i,j), i=1 to M, j=1 to N, and searching each pair.

Referring to the example graphical user interface shown in FIG. 2, the hit count K(ROW CONCEPT(i) for each of the ROW CONCEPTS is displayed in a ROW CELL(i) located, for example, within an ascending ordered vertical column in field labeled 22, which is located, in the example, to the left of the column of ROW CONCEPTS in field 16. Likewise, the hit count K(COLUMN CONCEPT(j) for each of the COLUMN CONCEPTS is displayed in a horizontal COLUMN CELL(i), which is located, in the example, in field 24 above the row of COLUMN CONCEPTS in field 18.

In a preferred embodiment, step 104 downloads each matching document into a storage (not shown) that is local to the general purpose computer with database access capability (not shown) on which the user is interfacing with this method through, for example, the graphical user interface of FIG. 2. The search step 1004 thus generates records HITS (ROW CONCEPT(i)) and HITS(COLUMN CONCEPT(j)) having information uniquely identifying each document found in the GDS database with information matching the referenced CONCEPT, and automatically downloads the identified documents into the HITS records. For example, if the selected GDS database is the World Wide Web and step 104 identifies, for a particular ROW CONCEPT(i), twenty web pages having matching information, the step 104 forms the record HIT(ROW CONCEPT(i)) as a list of twenty URL's, and other information as described below, and a downloaded copy of each of the twenty web pages.

Referring to the specific example in FIG. 2, ROW CONCEPT(1) is "heart", and ROW CELL(1) displays "15", meaning that K("heart") is "15" and, therefore, fifteen documents or other electronic files within the database being searched, which in this example is "Medical", contain a word or term within the definition of the CONCEPT of "heart". ROW CONCEPT(7) of the FIG. 2 example is "eyes" and ROW CELL(7) in field 16 displays "1", meaning that K(eyes) is "1" and, therefore, the GDS database had only one document or file meeting the definition of the CONCEPT "eye". Similarly, COLUMN CONCEPT(9) of the FIG. 2 example is "hypertension" and COLUMN CELL (9) in field 24 displays "8", meaning that K("hypertension") is "8" and, therefore, the GDS database had eight documents or files meeting the definition of the CONCEPT "hypertension".

Next, step 104 performs a systematic search of the GDS database using every possible pair of a ROW CONCEPT and a COLUMN CONCEPT. The specific order of the automatic pair formation and searching is a design choice. For purposes of example, the pair formation process begins by selecting the first ROW CONCEPT, which is ROW CONCEPT(1), logically pairing it, sequentially, with each individual COLUMN CONCEPT(j), j=1 to N, and, for each pair, performing a "search" of the selected GDS databases. Each pair is referenced herein as PAIR CONCEPT(1, j), j=1 to N. The process then selects ROW CONCEPT(2) and logically pairs it with each of the COLUMN CONCEPTS, to form N new PAIR CONCEPTs(2, j), j=1 to N. The step also searches the GDS database using each of the PAIR CONCEPTS. The process repeats until it has selected the $M^{th}$ ROW CONCEPT, paired it with each of the N COLUMN CONCEPTS, and searched the GDS database using each. The logical operation for the pairing may be selectable but, preferably, it is the Boolean AND function. Therefore, assuming that the AND function is used, PAIR CONCEPT (1, 1) is ROW CONCEPT(1) AND COLUMN CONCEPT (1).

Referring to the specific FIG. 2 example graphical user interface, the step 104 search of the GDS database using each of the PAIR CONCEPTs(i, j), i=1 to M, j=1 to N, generates a (M×N) records, labeled for reference as HITS (PAIR CONCEPT(i, j)), each identical in structure to the above-described HITS(ROW CONCEPT(i)) and HITS (COLUMN CONCEPT(j)) records. The step displays the hit count for each, referenced herein as K(PAIR CONCEPT(i, j)), in a corresponding PAIR CELL(i, j) in field 28 of FIG. 2.

The search query operation performed for each CONCEPT(i, j) is identified as a "search", but it is contemplated that, in some applications, it may be unnecessary to have an additional interface with, or query of, the selected GDS databases. Instead, the "search" for each PAIR CONCEPT(i, j) could compare HITS(ROW CONCEPT(i)) with HITS(COLUMN CONCEPT(j)) and identify all documents or files appearing in both HITS records. In a preferred embodiment, though, step 104 perform an actual query-based search on the GDS database using each PAIR CONCEPT(i, j). Searching each PAIR CONCEPT(i, j) may be preferable if, for example, the user had entered a limit (not shown) on the number of HITS for the ROW CONCEPTS and/or COLUMN CONCEPTS. For example, if a user or particular embodiments placed a limit of one hundred documents in each HITS record, and the GDS database were the World Wide Web then the number of documents listed in the HITS records might be a small percentage of the matching documents. If, for example, ROW CONCEPT(1) is "automobile", and COLUMN CONCEPT(1) is "Spanish" then the number of hits, i.e., K(automobile) and K(Spanish), is likely to be in the tens of thousands. The documents in the record HITS(Spanish), and HITS(automobile) would have only hundred of these. A comparison of the respective records of HITS(Spanish) with HITS(automobile) would, therefore, have a significant probability of missing many documents which, although having both "automobile" and "Spanish", were omitted from one or both of the one hundred documents listed in each of the HITS records. If, however, step 104 performed an actual query based search of the World Wide Web using the paired CONCEPT (automobile, Spanish) it is likely that the search would return a usable quantity of matching documents.

The above-described search step 104 may include a filter that is additional to the criteria set by the CONCEPTS. The filter may qualify documents based on features including, but not limited to, date, source, author, format and size. For purposes of this example the type of occurrence is anywhere in the document.

The specific code-level process of searching the database in field 12 for occurrences of each ROW CONCEPT(i), COLUMN CONCEPT(j) and PAIR CONCEPT(i, j) is a design choice, readily made by one of ordinary skill in the art. As known in the art, the specific code-level process depends, in part, on the structure of the database searched, whether or not the search is index-based, and on the interface requirements particular to the commercial database management system (DBMS) on which the database in field 12 is structured.

Referring to the FIG. 2 example graphical user interface, PAIR CONCEPT(1, 1) as identified above is the CONCEPT "heart" ANDed with the CONCEPT "treatment". This is referenced herein as PAIR CONCEPT(heart, treatment). As shown in FIG. 2, PAIR CELL (1, 1) displays "14", meaning that fourteen documents or files within the GDS database had information meeting the definition of "heart" and meeting the definition of "treatment". Similarly, PAIR CONCEPT(4, 6) is ("liver","stroke"). It is seen from the "0" displayed in PAIR CELL(4, 6) that K("liver", "stroke") is "0", meaning that the "Medical" index of this example did not contain any documents or files having information meeting both the definition of the CONCEPT "liver" and the CONCEPT "stroke".

As described below, the scope of information that is within the meaning of a CONCEPT is determined by the user-entered, or previously stored Boolean phrase defining the CONCEPT, and by EXPANDORS added by the user to the typed letter strings appearing in fields 14 and 18.

As described and shown by the FIG. 2 example graphical user interface, the method of this invention provides the user, by clicking on the "Search" button 20 one time, with the results of M plus N, plus (M times N) searches. The user then sees in, for example, the graphical user interface of FIG. 2, the comparative frequency of occurrence of all M of the ROW CONCEPTS, all N of the COLUMN CONCEPTS, and the (M×N) pairings formed by PAIR CONCEPTS(i, j), for i=1 to M, j=1 to N. This is substantially more efficient, and more exhaustive in its search coverage, than the prior art method of picking a search query term, or formulating a single Boolean expression, performing a search, observing the results, and then picking a succession of other terms and expressions until the result "looks right" to the user.

For example, in the specific example depicted in FIG. 2 the number of ROW CONCEPTS is seven and the number of COLUMN CONCEPTS is twelve. Step 104 then generates a HITS record for each of the seven COLUMN CONCEPTS, a HITS record for each of the twelve ROW CONCEPTS, and (seven times twelve), or eighty-four, HITS records for each of the PAIR CONCEPTs(i, j), i=1 to 7 and j=1 to 12. The total number of searched query terms and expressions of the same, and the number of HITS records showing the search result, is therefore, in the specific example shown in FIG. 2, one hundred three. To have this coverage with the method of the prior art the user would have to manually perform one hundred one searches. The user would then have to write down or otherwise store, the results of each search. Even if the user managed to perform such a task, which would be a formidable job to complete, he or she would have expended considerable time that could have been otherwise used more effectively, and would not have the benefit of a single matrix formatted display of all the search results as is presented in FIG. 2.

The above-identified step 104 searches for each ROW CONCEPT, each COLUMN CONCEPT and each PAIR CONCEPT(i, j) may be performed sequentially, or in parallel (i.e., concurrent), or as a combination of sequential and parallel. As known to persons skilled in the art of query searches, the selection between sequential and parallel depends in part on the structure of the database and the specific software design of the search engine. The current commercialized reductions to practice of the this invention use a sequential search, where COLUMN CONCEPT (1) is searched, a record of HITS(COLUMN CONCEPT (1)) is generated, and then COLUMN CONCEPT 2 is searched and so on until all of the COLUMN CONCEPTS have been searched. Related to the sequential search is a STOP SEARCH user interface button (not shown) appearing on the graphical user interface such as the example of FIG. 2. As described above, in a preferred embodiment of the step 104 sequential search the HITS record is generated and the numbers K(CONCEPT) are displayed in sequence as the search progresses through the CONCEPTS. It is contemplated that particular choices of CONCEPTS and/or user-entered definitions of CONCEPTS, the definition process being described below, will yield HITS records necessitating a change of CONCEPTS. The STOP SEARCH button enables the user to stop the step 104 search accordingly.

Referring to FIGS. 2 and 3, the process of defining CONCEPTS will be described. FIG. 2, as described above, is an example graphical user interface 10 for performing the search step 104. FIG. 3 shows an example graphical user interface 320 for defining the CONCEPTS. Field 320 includes a CONCEPT LIST 322 which lists all CONCEPTS that one or more users have defined. The list of CONCEPTS can be global, or can be particular to a user, the latter being written according to standard software design practice for multi-user programs having one or more parameter lists specific to particular users.

Field 322 of FIG. 3 displays the following CONCEPTS: "AIDS", "CHEMWPNS", "DRUGS", "HEARATK", "MDR", "MEXICAN", "OC", "TERRORISM", "USEAST", "USGSI", "USSOUTH", "USWEST", "VIOLENCE" and "WEATHER". The FIG. 3 example provides the user means to highlight one of the CONCEPTS in the list 322, such as the "WEATHER" that is highlighted at 322A in the figure. The code for displaying a list of entries in a file, scrolling through the displayed entries, and highlighting one or more of the list using, for example, the left click of a conventional computer mouse is well known in the relevant arts and, therefore, description is omitted. Field 324 displays the selected CONCEPT and field 326, labeled EXPANSION, shows the Boolean expression that defines it.

Field 328 of FIG. 3 presents the user with a list of CONNECTIONS and EXPANDORS, which are Boolean operators and search query expandors/modifiers for connecting and modifying terms within the expression appearing in field 324. Example CONNECTIONS in the FIG. 3 field 328 are: "AND", "OR" and "WITHIN#". Example EXPANDORS are: "Concept@", "Fuzzy %", "NOT", "PHONIC", "STEMMING", and "SYNONYMS". Each of the example CONNECTIONS is a Boolean logic term that is known in the art relating to this invention. The example EXPANDORS of "NOT", "PHONIC", "STEMMING" and "SYNONYMS" are likewise well known, and further description is therefore omitted. The example CONNECTION labeled "Concept@" denotes the CONCEPT following it as, itself, another defined CONCEPT. For example, a CONCEPT typed into field 324 as "ROAD" would be defined as the four letter string "R,O,A,D". The search step 104 would therefore look for this four letter string when searching the GDS databases. On the other hand, if the user had defined the CONCEPT "ROAD" using the FIG. 3 example graphical user interface, and then stored it in the list of CONCEPTS in field 322, then subsequent use of that definition could be invoked by typing it as "@ROAD". An example definition of "ROAD" would be "street OR avenue OR boulevard". The example CONNECTION labeled "Fuzzy %", where "fuzzy" is defined according to its understood meaning in the arts pertaining to this invention.

As can be understood by persons skilled in the arts relating to this invention, the use, power and computational overhead relating to particular CONNECTIONS and EXPANDORS depends, in part, on the particular structure of the GDS databases selected at step 100, in addition to the indexing scheme, if any.

Referring to the FIG. 3 example, the selected CONCEPT is "WEATHER", which is defined in field 66 as "storm or rain or winds or tornado or "hurricane or snow or "flood or storm surf or weather-related or NOAA or thunderstorms or El Nino". The tilda sign "" is a wild card. The Boolean OR operator in field 328 connects the terms and, therefore, the expression in field 326 defines the CONCEPT "WEATHER" as any word or information that meets any term in the expression.

The CONCEPT definition field 320 of FIG. 3 allows a user to define existing words in a manner suited for the particular search, and to coin new CONCEPTS. For example, if a user wished to define "ski" to focus on water skiing and not include snow skiing it could be entered in the list 322 and defined in field 326 as SKI AND WATER AND BOAT. Alternatively, the user could coin a word, such as SNSKI, to have the same meaning.

Figure 4:
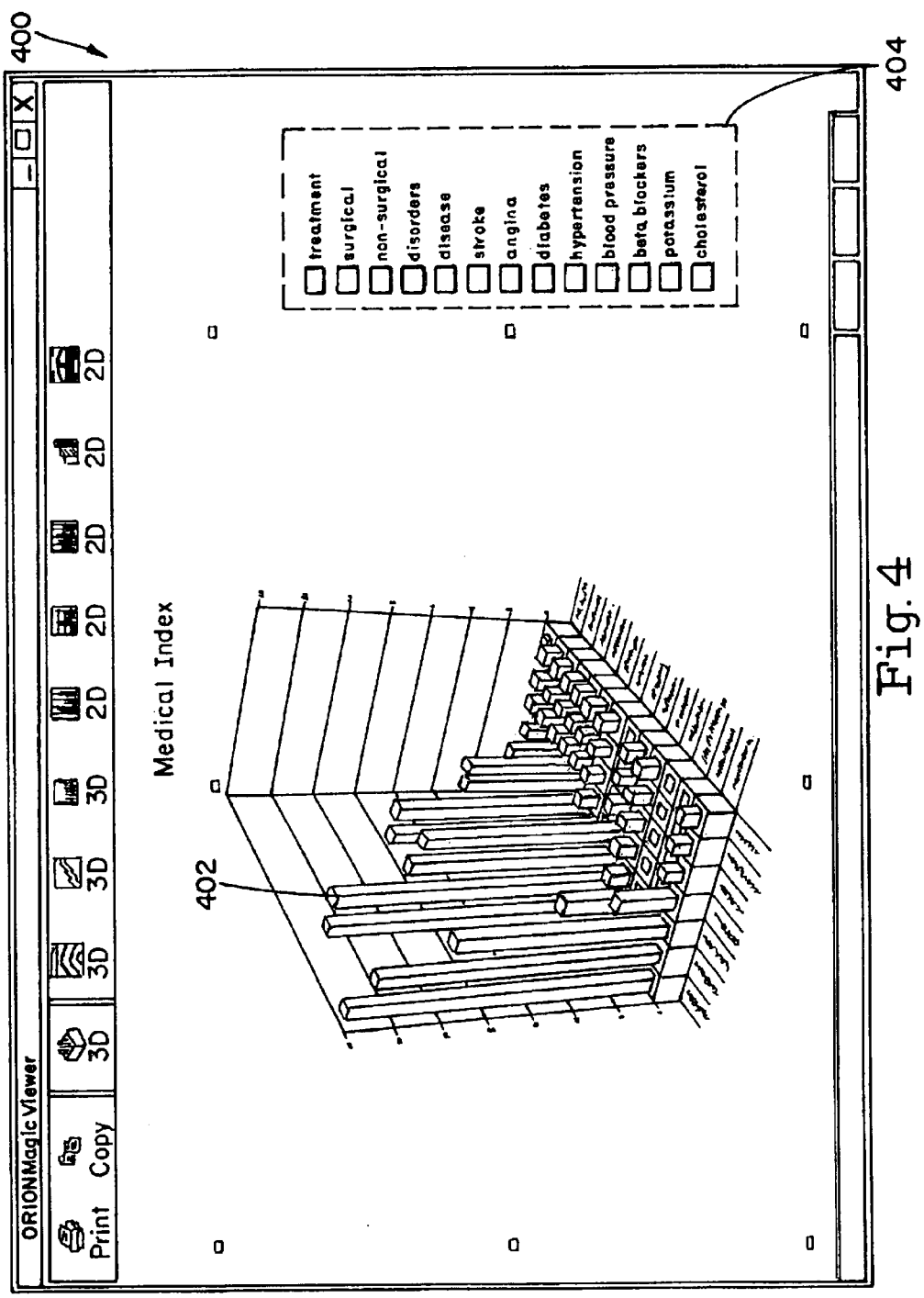
FIG. 4 shows an example of three-dimensional graphical search matrix display in accordance with the method of the present invention.

FIG. 2 shows the search results of step 102 as a two-dimensional array of numbers, as ROW CELLs in field 22, COLUMN CELLs in field 24, and PAIR CELLS in field 28, reflecting the HITS record obtained for each of the ROW CONCEPTS, COLUMN CONCEPTS, and PAIR CONCEPTS (i, j). Referring to FIG. 4, an optional feature of the invention displays the K numbers for each HITS record as a three dimensional graph 400, with the height of each cell graph, a representative one being labeled as 402, representing the search results of the cell's associated COLUMN CONCEPT, ROW CONCEPT or PAIR CONCEPT(i, j). The FIG. 4 example sets the height of each cell graph 402 according to the number of documents or files meeting the criteria of the cell's corresponding CONCEPTS. The FIG. 4 display also includes a legend 404 which shows color codes of the CONCEPTS embodied by the COLUMN CONCEPTS and ROW CONCEPTS. The cell graphs 402 of each PAIR CONCEPT(i, j) may also be color coded as a blend of its constituent $i^{th}$ ROW CONCEPT and $j^{th}$ COLUMN CONCEPT.

Referring to the high level flow chart of FIG. 1, and the graphical user interface FIGS. 2 and 5, an analysis step 106 that is closely integrated with the search step 104 will be described. Step 106 can be used after each iteration of search step 104 and, based on commands received from the user, assists in analyzing the search using information provided by the HITS records generated at step 104. It will be understood that describing step 106 as the "next step" is for purposes of describing an example operation of this invention. As will be understood, the analysis step 106, as well as the later described steps of collection and reporting, do not have to be completed before re-running step 104, either with different ROW CONCEPTS and COLUMN CONCEPTS, or after returning to steps 100 and 102 to select different GDS databases or indexing operations on the same. Also, as will be described, the present method permits the user to perform a "drill down" search on the documents within the HITS records in any of the ROW CELLS, COLUMN CELLS, or PAIR CELLS of FIG. 2.

Referring to FIG. 2, after the step 104 search the user is presented with a two dimensional array of HITS records, with the number of documents within the HITS record appearing in the cell corresponding in position to the CONCEPTS searched. As described above, each HITS record contains an identifier of each of the documents obtained by the search of the CONCEPT or pair of CONCEPTS corresponding to the cell. The user can then highlight any of the cells using, for example, the left click of a conventional computer mouse whereupon step 106 presents, in field 30 of FIG. 2, the ordered list of documents identified in the record HITS corresponding to the selected cell. For example, in FIG. 2 PAIR CELL(1, 1) in field 28 is highlighted. PAIR CELL(1, 1) corresponds to PAIR CONCEPT(1, 1), which is (heart, treatment). As shown by the number "14" appearing in PAIR CELL(1, 1), seven documents were found in the "Medical" database index having information within the meaning of the "heart" CONCEPT and the "treatment" CONCEPT.

When the user highlights PAIR CELL(1, 1) the display field 30 presents, in the FIG. 2 example, the first five documents in the HITS(heart, treatment) record. The display field 30 has, for each document listed, a field 30A for the document order number, a field 30B for the document's file name, a field 30C for the size in bytes of the document, a field 30D for the title of the document, if any exists, a field 30E identifying a date associated with the document, and a field 30F identifying the GDS database or database index name in which the document was found. As will be understood by one of ordinary skill, depending on the GDS database searched, and whether or not the GDS was indexed, the documents may not have "names" and, in such cases, there may be no data appearing in field 30B. Similarly, in some instances, there may be no date data appearing in the field 30F.

The ordering of the documents listed in field 30 is a design choice, and may be in accordance with, for example, the "relevance" ordering used by Yahoo. In the particular example shown in FIG. 2, the ordering is according to the number of occurrences, within the documents, of the search CONCEPTS for which the documents were obtained. Referring to FIG. 2, the uppermost document, having a label of "1" in field 30A, as it has the highest number of occurrences of the PAIR CONCEPT (heart, treatment) of any of the documents listed, namely "30" as appears in field 30B.

Figure 5:
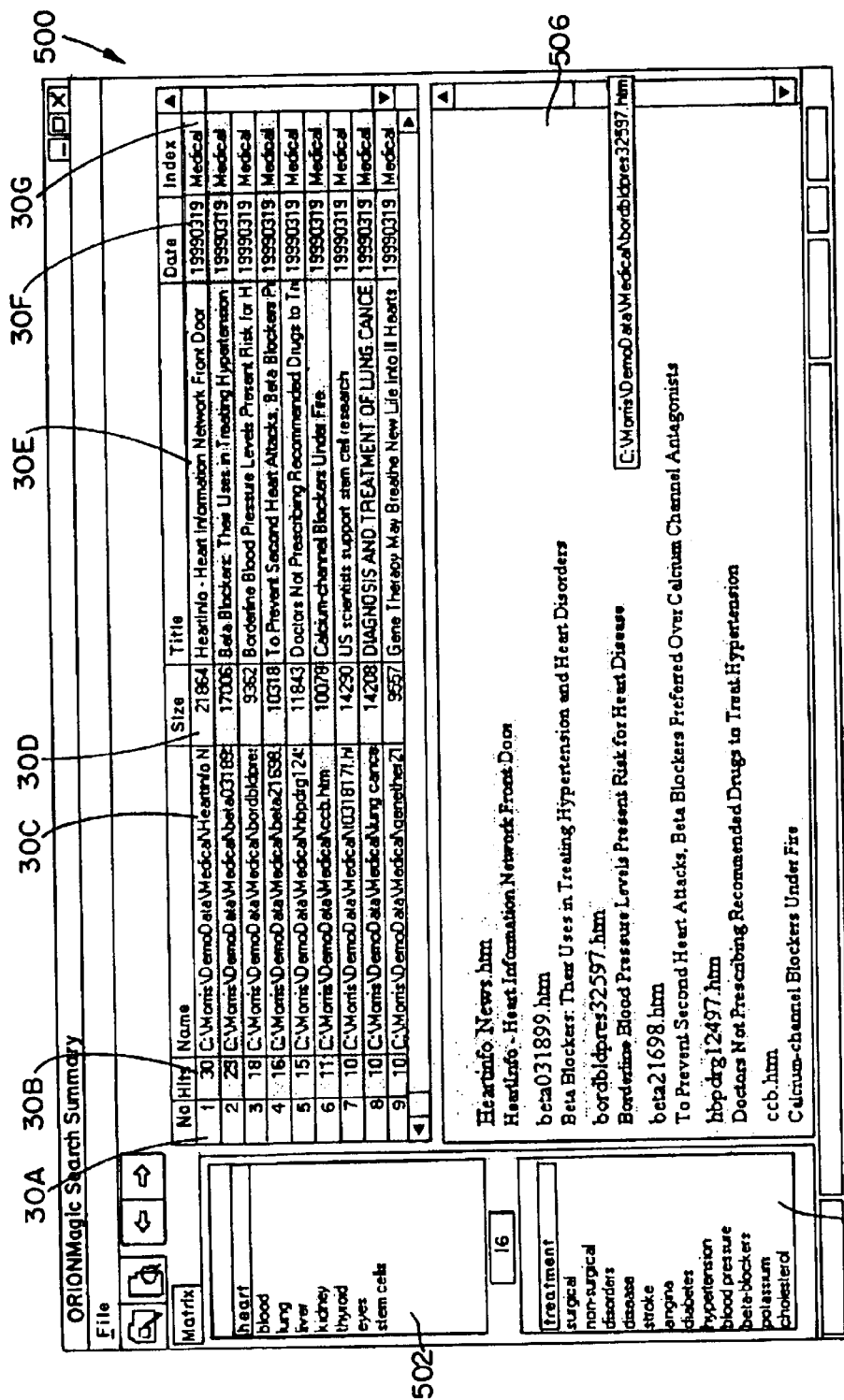
FIG. 5 shows an example display of a search result speed reading feature from the graphical user interface of FIG. 2.

Also in step 106 the user can click a MATRIX SPEED READING button (not shown) on the graphical user interface of FIG. 2 and will be presented with a new graphical user interface such as, for example MATRIX SPEED READING display 500 of FIG. 5, allowing a quick reading of the documents within the HITS record for any cell in field 30 of FIG. 2. As shown in the example MATRIX SPEED READING display 500 includes a field 502 and a field 504 listing, respectively, all of the COLUMN CONCEPTS and ROW CONCEPTS used in the search step 104. Through a standard interface device such as, for example, a mouse (not shown) the user highlights one of the ROW CONCEPTS in field 502 and, if the user wishes to view the search results for a PAIR CONCEPT(i, j), also highlights one of the COLUMN CONCEPTS in field 504. In the particular example shown in FIG. 5 the user has highlighted the ROW CONCEPT "heart" and the COLUMN CONCEPT "treatment", which presents a scroll list in field 30, as described in reference to FIG. 2, having short descriptions of the documents in the record HITS("heart", "treatment"). Field 506 scrolls through a more detailed description of the documents listed in field 30.

Figure 6:
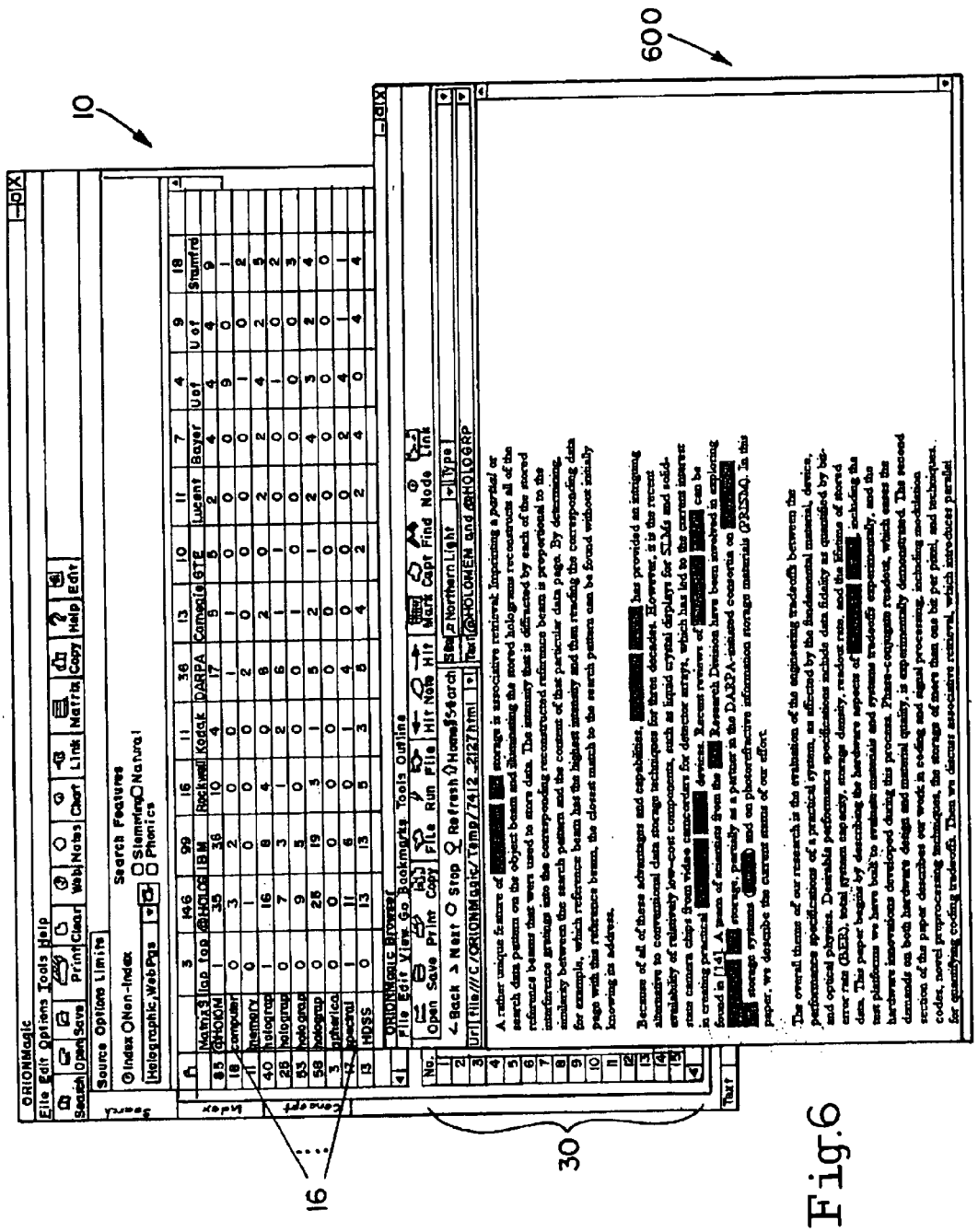
FIG. 6 shows an example of the search graphical user interface according to FIG. 2, using different search queries, with an overlay of a jump window using a browser feature of the present invention.

Referring to FIG. 6, another search example using the search matrix graphical user interface 10 of FIG. 2, with a further result browser feature 600 of the invention, will be described. Field 16 of FIG. 6 lists ten particular ROW CONCEPTS including "@HOLOMEM", which is ROW CONCEPT(1), and "holograph", which is ROW CONCEPT 5, and "HDSS", which is ROW CONCEPT(10). As described in reference to field 328 of the CONCEPT definition interface area 320 in FIG. 3, the ampersand "@" prefix to "HOLOME" in ROW CONCEPT(1) means that the CONCEPT "HOLOME" is in the CONCEPT list of field 322 and, accordingly, it is defined according to a Boolean expression appearing in field 326.

Referring to FIG. 6, CONCEPT(5) is "holograph, which is a self-defined search query term of "holograph" including, as indicated by the tilda "~", a tail of any letter string.

A shown in FIG. 6, the user has highlighted PAIR CELL(1, 2), corresponding, in the example, to PAIR CONCEPT ("@HOLOMEM", "@HOLOGRAM"). The PAIR CELL(1, 2) displays "45", meaning that the number of documents in this HITS record is forty-five. As described in reference to FIG. 2, the user's highlighting of PAIR CELL(1, 2) causes a list of the documents identified in HITS ("@HOLOME", "@HOLOGRAM") to appear as a scroll list in field 30. The user can then highlight any of the documents in field 30, whereupon a browser (not shown) retrieves the documents and displays it in field 600. Field 600 may, depending on the design choice for the browser, be an overlay window appearing with the field 30 display.

As seen from the example text appearing in field 600 of FIG. 6, the browser automatically highlights all occurrences of the search CONCEPTS within the selected document. The specific code-level design of the browser is readily generated by one of ordinary skill in the arts relating to this invention and, accordingly, description is omitted.

Figure 7:
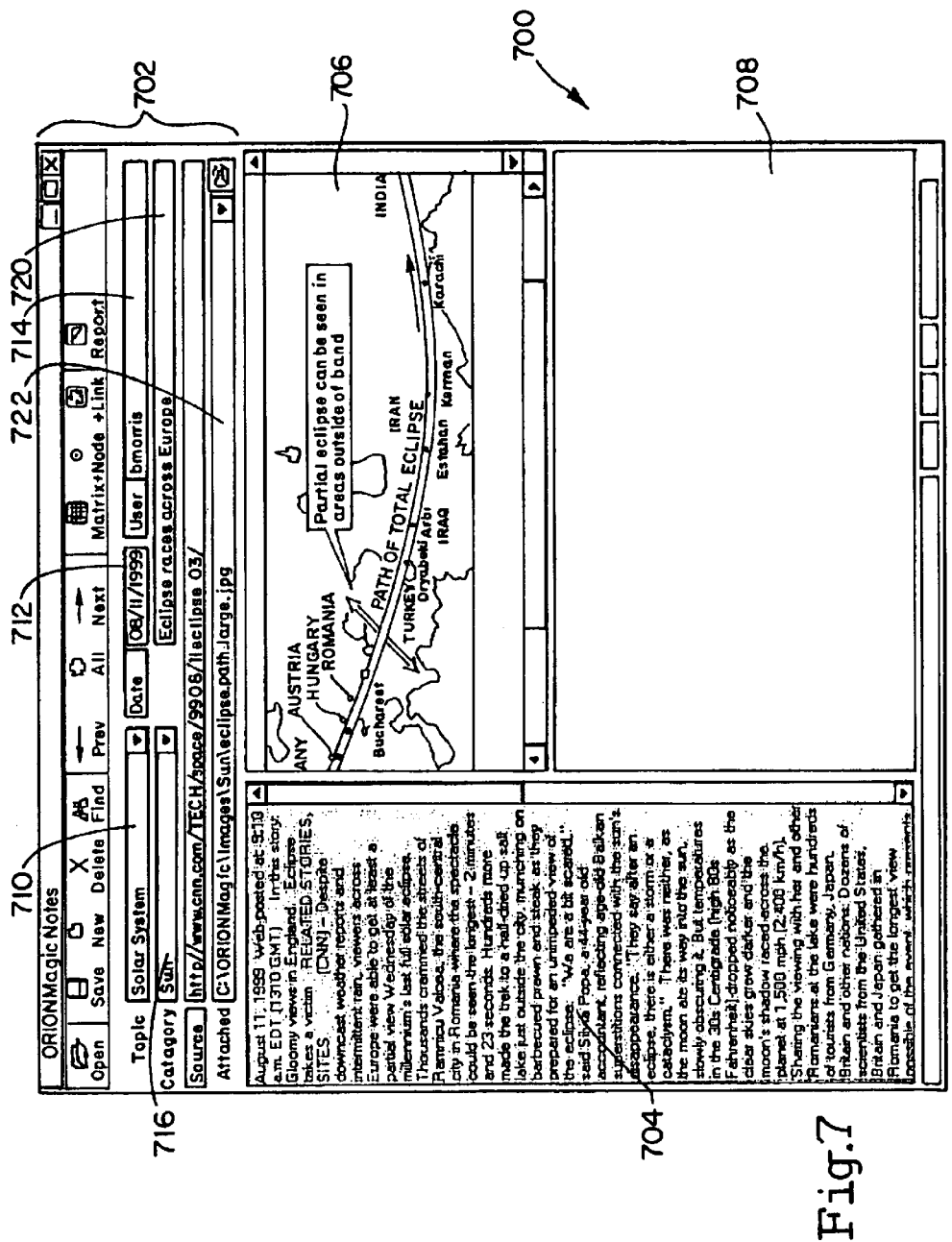
FIG. 7 shows an example graphical user interface for a multimedia search information collection step in accordance with the method of the present invention.
Figure 8:
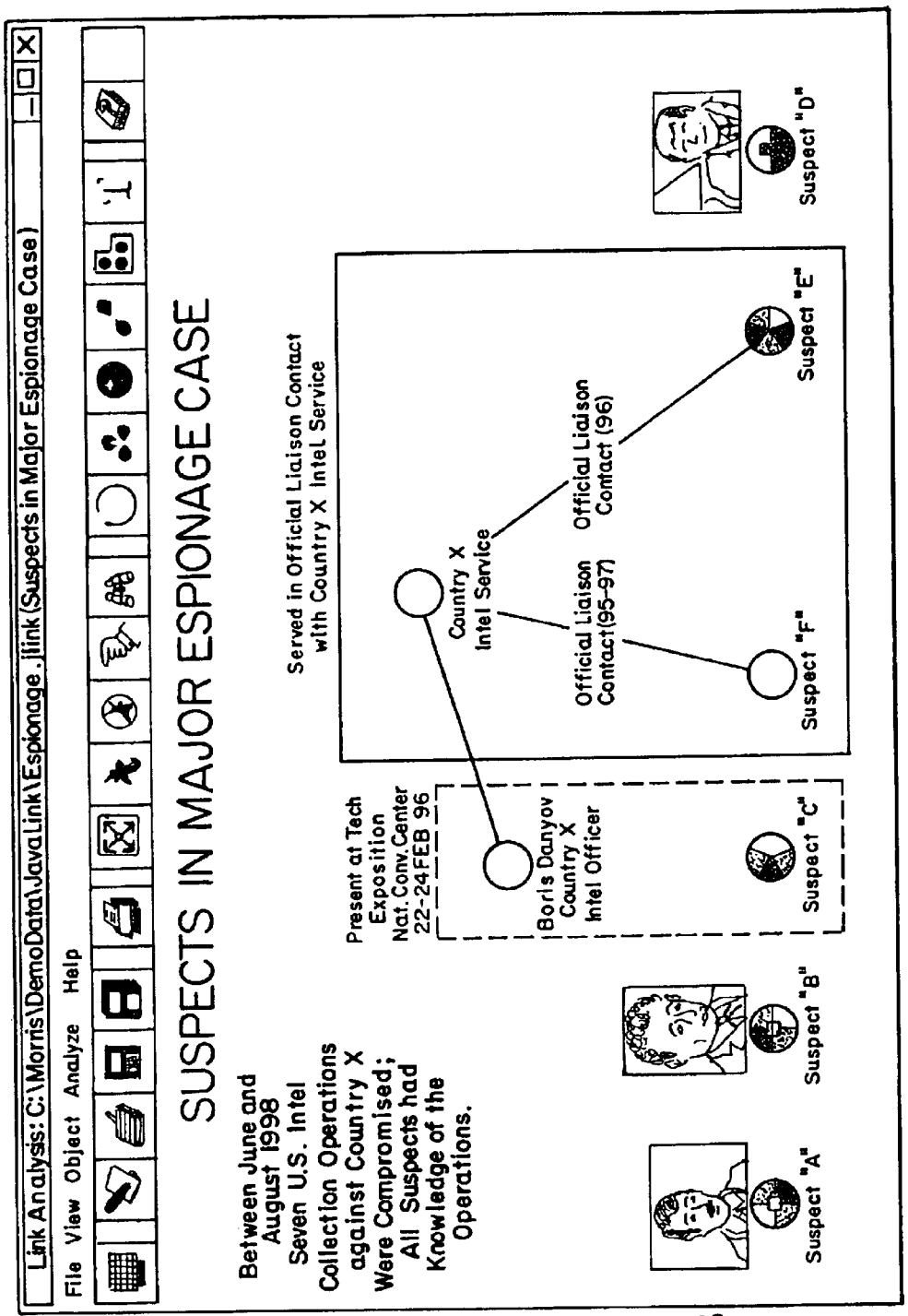
FIG. 8 shows an example display of a search result linking feature in accordance with the method of the present invention.

Referring to FIGS. 1, 2 and 7, a collection step 108 and organizing step 110 for systematically extracting information from user-selected documents within a HITS record, and placing that information into a convenient, consistent, user-specified template for ready insertion into a template report will be described.

First, as described referring to FIG. 2, the user analyzes the search results by viewing the ROW CELLS, COLUMN CELLS and PAIR CELLS in fields 22, 24 and 28, clicking on those of interest, scrolling through the documents and reading the contents. The user can now generate a NOTES document, such as the example in FIG. 7, which is a template onto which the user pastes information from the particular document which the user has selected and is reading using, for example, the browser feature described in reference to FIG. 5. The user generates a NOTES document such as shown in FIG. 7 by clicking on the "NOTES" screen button 32 in FIG. 2, which generates a pull-down from which the user can generate the document.

Referring to FIG. 7, each NOTES document 700 is a summary profile of a particular document obtained by the search step 104, the NOTES document 700 being formatted for the user to enter certain information in specific fields. An example formatting is shown in FIG. 7, and consists of a HEADER 702, a DOCUMENT TEXT field 704, a DOCUMENT IMAGE field 706, and a COMMENT field 708. The HEADER field 702 includes TOPIC field 710, a document DATE field 712, a USER field 714, a CATEGORY field 716, a LABEL field 718, a SOURCE field 720, and an ATTACHED field 722. Some of the HEADER fields 710–722 are automatically filled in, using the information in the HITs record that listed the subject document. These include the DATE field 712 and the SOURCE field 720. The user selects and enters information into the TOPIC FIELD 710, the CATEGORY field 716 and the LABEL field 718, preferably using an outline hierarchy for the REPORT step 112 of FIG. 1, described below, to assemble a plurality of NOTES into a REPORT.

Referring to FIGS. 6 and 7, information from a document listed in FIG. 6 field 30, and selected and displayed through the browser shown by FIG. 6 field 600 is moved into the NOTES document of FIG. 7 by a "drag and drop" process that, itself, is well-known in the relevant arts. More particularly, the user would select, typically by highlighting, text portions from the document appearing in the browser display 600, and "drag and drop" those portions into the DOCUMENT TEXT field 714 of the NOTES document. If the document appearing in the browser display 600 is in HTML format, or another format supporting hyperlinks, the text appearing in field 714 will have those hyperlinks. If there are any images using, for example, .jpg or .tiff format, within the document appearing in the browser display 600 the user can insert these into the DOCUMENT IMAGE field 718. After or during the "drag and drop" operations the user can type his or her own comments into the COMMENT field 708.

In a typical search session using the method of the present invention the user may generate a plurality of, for example, ten FIG. 7 NOTES documents 700.

As will be understood, the described method covers the entire knowledge management process of searching, collecting, analyzing, organizing, and reporting. it provides the ability to conduct text searches across files, documents, Web pages, and databases located anywhere on the user's personal computer, network, or Internet. The present invention is not just a search toll; it includes the described set of analytical and reporting tools enabling the user to evaluate the results of searches, organize and create reports. The described method for searching a relational database(s) or a collection of unrelated documents and text files.

Search step 104 can be repeated, using the HITS records identified by any particular COLUMN CELL, ROW CELL or PAIR CELL as the universe of documents searched. The documents can be searched, by applying another set of COLUMN CONCEPTS and ROW CONCEPTS to the results of the first search. This can be repeated as often as the user wishes. This is commonly referred to as "drilldown".

The matrix search parameters, i.e., the GDS database, the ROW CONCEPTS and COLUMN CONCEPTS, and the HITs records of the results can be saved, using file storage methods well-known to persons of ordinary skill in the arts relating to this invention, for later use and shared with other users.

The matrix search parameters, i.e., the GDS database, the ROW CONCEPTS and COLUMN CONCEPTS, and the HITs records of the results can be exported/copy filed into other directories by selecting the result ROW CELLS, COLUMN CELLS and PAIR CELLS. This enables the user to reorganize his data into other directories and also send collections of data to other users.

The described Collecting step 108 enables the user to store full or partial text (selected by highlighting words) into digital filing system collections database, and to save multimedia type documents (e.g., .jpeg, .gif, .wav). The described DOCUMENTS TEXT field 704, DOCUMENT IMAGE field 706 and COMMENT field 708 of the FIG. 7 NOTES documents 700 enables the user to include other related data into collection fields, store hyperlink back to the original source. In addition, the format of NOTES documents 700 allows them to be collected as a library (not shown) for rapid searching, using the HEADER 700 as an index. Further, the formatting of the NOTES documents allows step 112 to generate web-ready REPORTS from the collection database. In addition, a Create Link Analysis function of step 112 provides charts/reports that are linked back to items in the collection database. These Links reports can be shared with other users.

Figure 9:
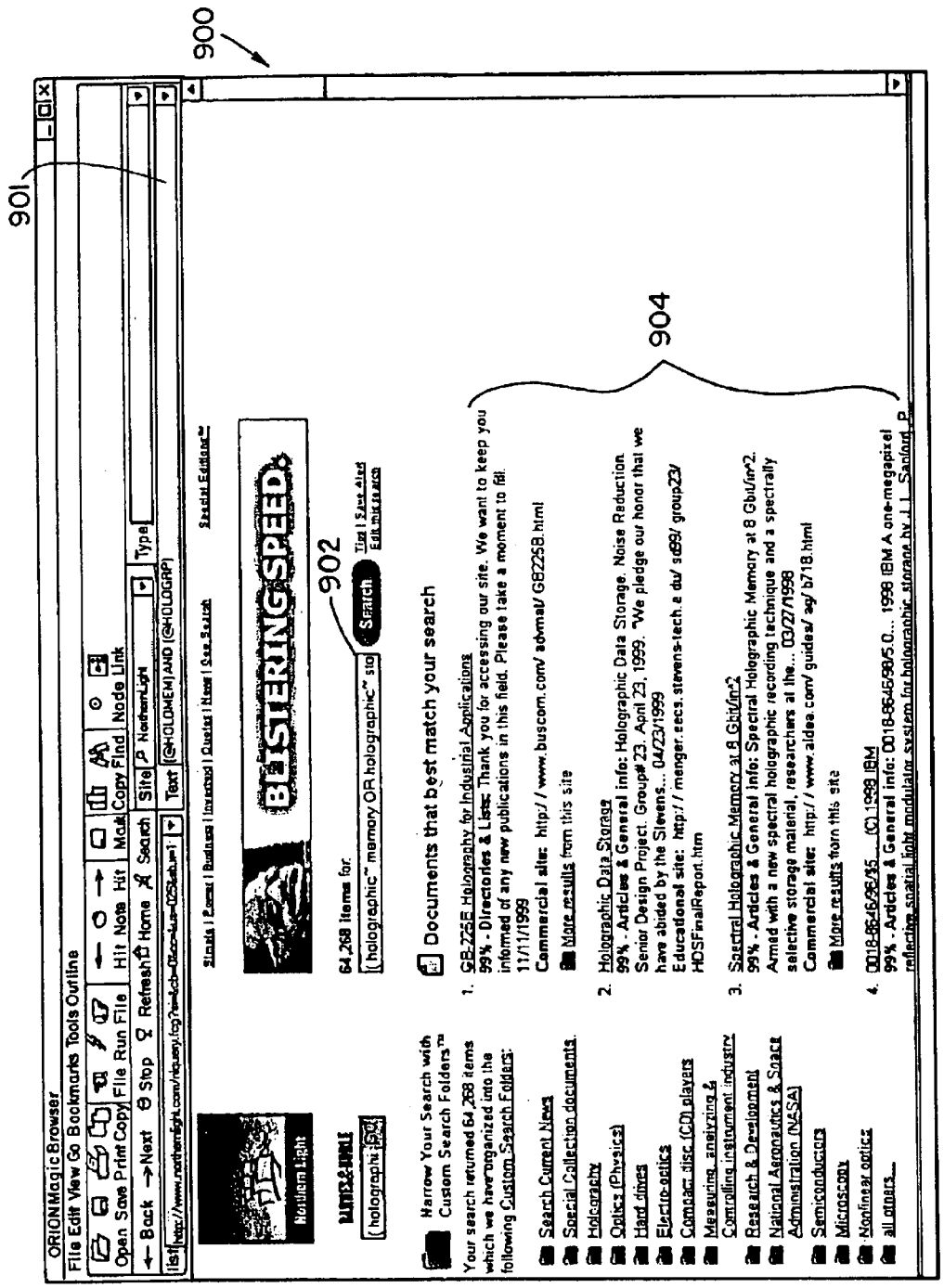
FIG. 9 shows an example graphical user interface for searching the same queries as FIG. 8, using a different search database selection, and linking to a third party search engine.

Referring to display 900 of FIG. 9, a further embodiment of this invention uses the matrix of ROW CONCEPTS and COLUMN CONCEPTS entered, for example, through the FIG. 2 example interface, with a third party search engine. The FIG. 9 example uses the Northern Lights® search engine to search the Internet using the CONCEPTS of the FIG. 6 example. The CONCEPT matrix search process is in accordance with the FIG. 6 example, namely searching M ROW CONCEPTS(i), i=1 to M, searching N COLUMN CONCEPTS(j), j=1 to N, and then all M×N PAIR CONCEPTS(i, j), i=1 to M, j=1 to N. An additional operation is that the CONCEPTS are converted in to a form compatible with, for the FIG. 9 example, the Northern Lights search engine. More particularly, the field 901 shows that the specific PAIR CONCEPT searched in the FIG. 9 example is the PAIR CONCEPT ("@HOLOMEM", @HOLOGRP"). As described, the preferred logical operation for forming a PAIR CONCEPT from a ROW CONCEPT and a COLUMN CONCEPT is the AND operation. The PAIR CONCEPT ("@HOLOMEM", @HOLOGRP") is therefore, for this example, the CONCEPT "@HOLOMEM" ANDed with the CONCEPT "@HOLOGRP". To carry out the search, the method identifies the leading ampersand of each of the CONCEPTS and, in response, automatically expands each into its Boolean expression, as described in reference to FIG. 3. The expression is then re-formatted for loading into field 902 which, for this example, accommodates the Northern Lights® search engine.

The specific example expansion is as follows: It is assumed that the CONCEPT of "@HOLOMEM" was previously defined using, for example, the graphical user interface of FIG. 3, as ("holographicmemory" OR "holographic itprage" OR "holographicdata" OR "holographic recording" OR "HDSS" or "HolographicData Storage System" OR "optical storage" OR "spectral recording" OR "spherical memory"). The tilda "" after "holographic" is, as described above, a wild card ending which encompasses for example, "holographical". It will also be assumed that "@HOLOGRP" was previously defined as ("IBM" OR "University of Dayton" OR "Lucent" OR "Bayer Corp" OR "Rockwell" OR "Kodak" OR "Stanford University"). The method therefore performs the search shown in FIG. 9 by ANDing the respective expansions of "@HOLOMEM" and "@HOLOGRP" and formatting the resulting expression as required by the Northern Light® search engine, as shown in field 902. The formatting operation is readily implemented in conventional scripting code by one of ordinary skill in the arts relevant to this invention.

Figure 10:
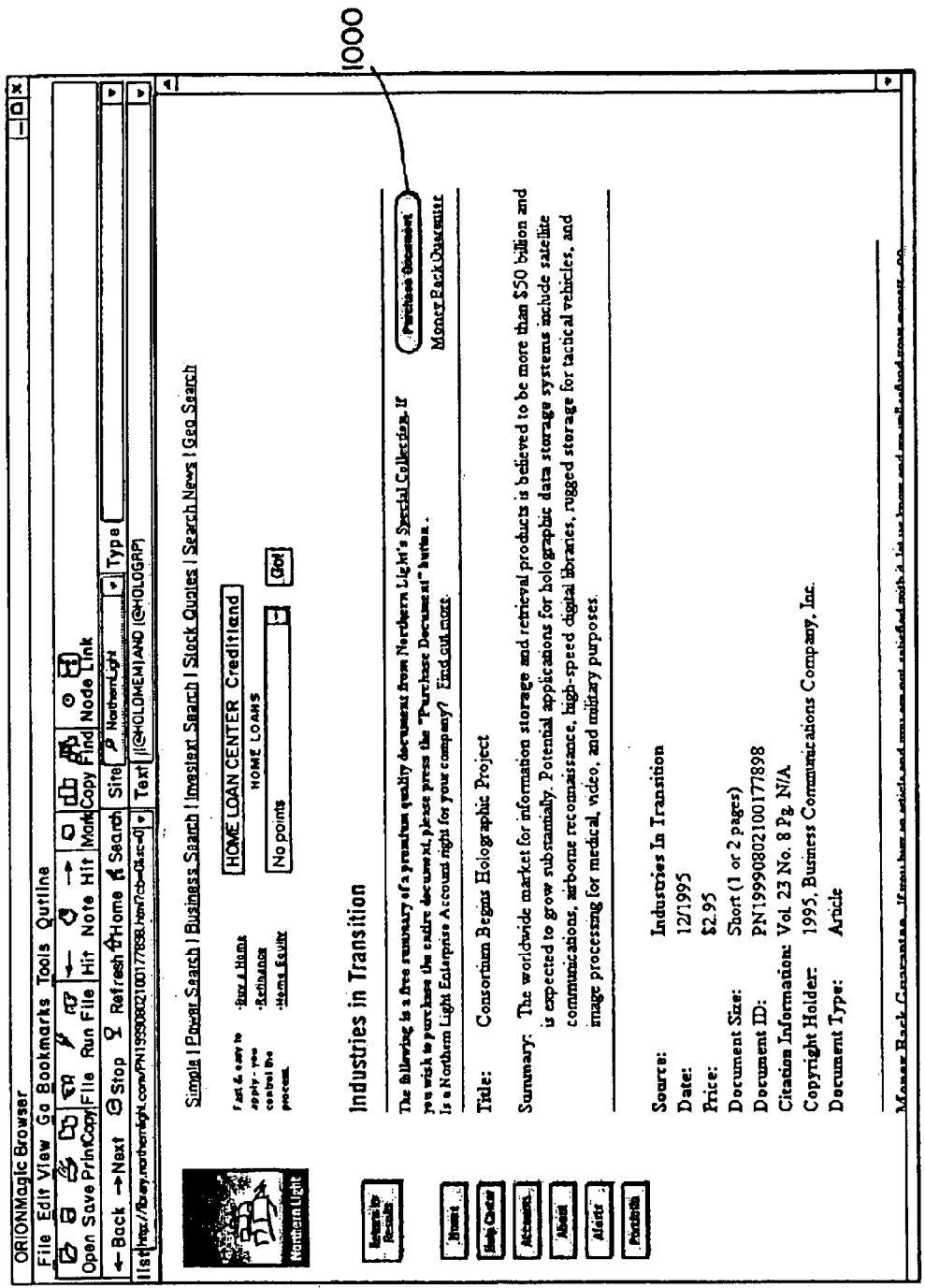
FIG. 10 shows an example display of a hyperlink accessed through the example graphical user interface display of FIG. 9.

Referring to FIGS. 6 and 9, the entire matrix of ROW CONCEPTS, COLUMN CONCEPTS and PAIR CONCEPTS shown in FIG. 6 is searched by formatting each CONCEPT, or PAIR CONCEPT such as, for example, the individual and PAIR CONCEPTS "@HOLOMEM" and @HOLOGRP", performing the search for each, and displaying the results in the matrix format of, for example, FIG. 2. The search results are listed in field 904. Each entry (not labeled) in field 904 has a hyperlink (not labeled) such as, for example, "HOLOGRAPHIC DATA STORAGE", which is entry "2", in accordance with the standard format of Northern Lights and similar pay-per-document search services. As known to one of ordinary skill in the arts pertaining to this invention, clicking on any of the hyperlinks downloads either a complete document or, as typical with services such as Northern Lights®, a summary, as shown in FIG. 10. Referring to FIG. 10, the user typically purchases the document by clicking on, for example, field 1000. The resulting purchase operation is well known in the art.

Figure 11:
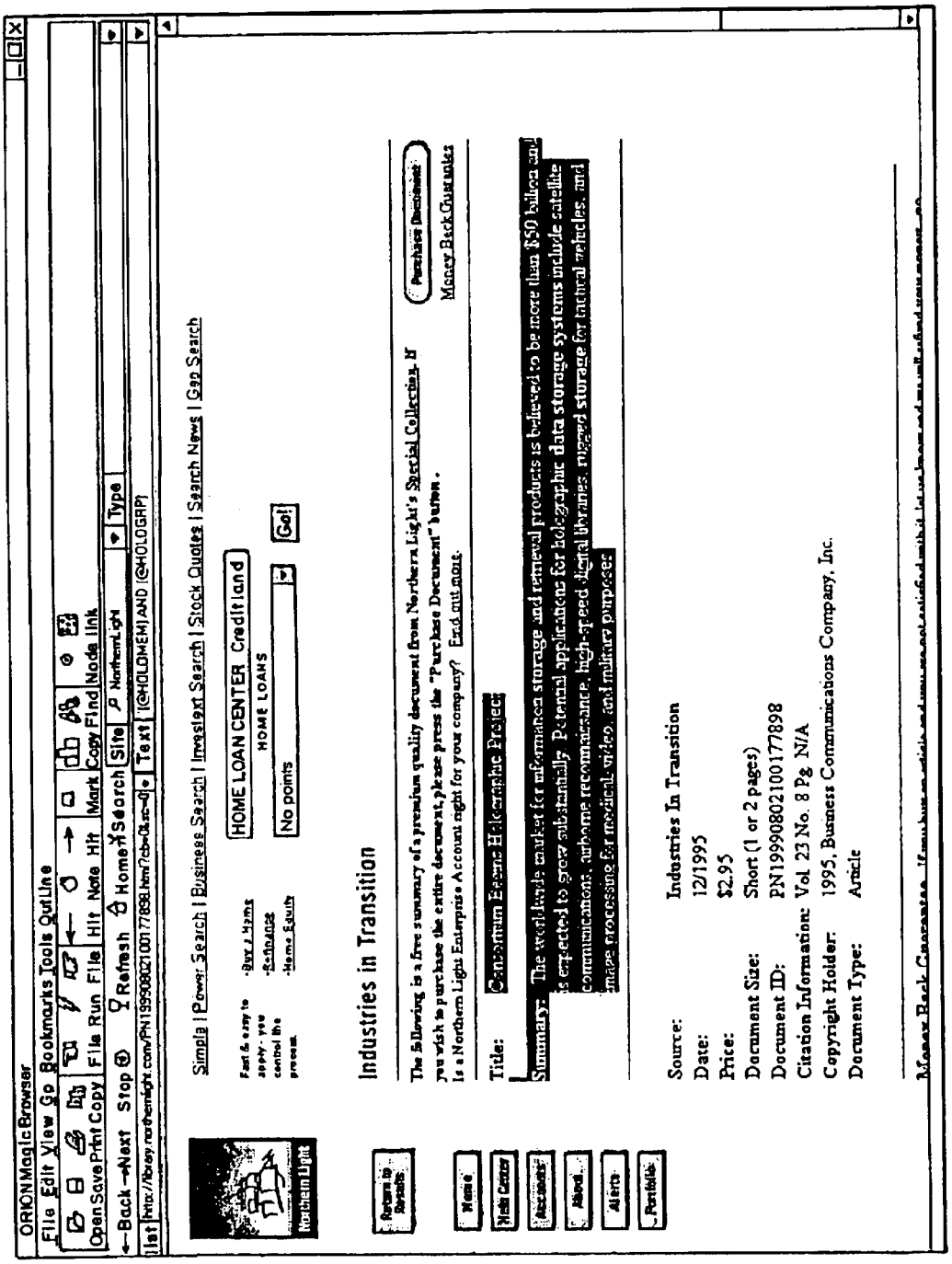
FIG. 11 shows an example of a user collecting information from the example graphical user interface of FIG. 10.
Figure 12:
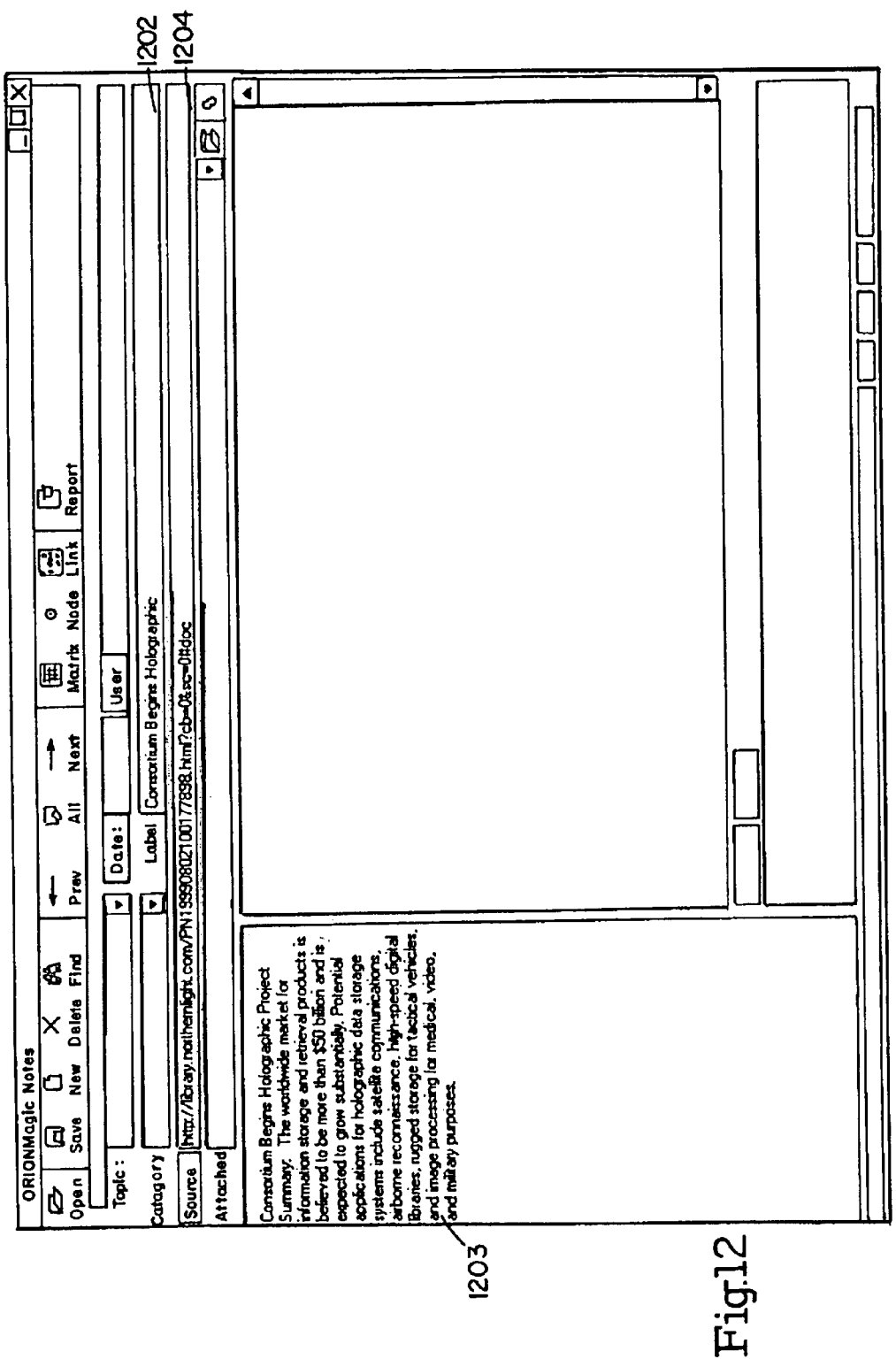
FIG. 12 shows an example of a search collection document into which the information highlighted in FIG. 11, and related user-generated tags, are inserted.

It will be understood that, typically, the quick reading feature described in reference to FIG. 5 will not be available when the matrix search of CONCEPTs interfaces to and uses pay-per-view search engines. Similarly, the browser feature of FIG. 6 is not available. Referring to FIGS. 6, 7, 11 and 12, however, the previously described NOTES document generation can be used with typically free summaries provided by the third-party search services. More particularly, as shown in FIGS. 9, 10 and 11, pay-per-document search services such as, for example, Northern Lights typically download a summary of a document that a user clicks on, providing enough information to the user to allow a proper decision to purchase. FIG. 11 shows such a summary, which the service such as Northern Lights downloaded to the user in response to the user clicking on one of the hyperlinks in FIG. 9 field 904, as described above. Fields 1100 and 1102 show the title and content of the summary, respectively, after being highlighted by the user. Referring to FIG. 12, the content of the highlighted fields 1100 and 1102 from FIG. 11 are inserted into fields 1202 and 1203, respectively, of the generated NOTES document in the manner described in reference to FIG. 7. Field 1204 of FIG. 12 contains the URL identifier of the summarized document. The user or another person can then use the NOTES document shown in FIG. 12 to retrieve and pay for a complete content of the document.

While the present invention has been disclosed with reference to certain preferred embodiments, these should not be considered to limit the present invention. One skilled in the art will readily recognize that variations of these embodiments are possible, each falling within the scope of the invention, as set forth in the claims below.

What is claimed is:

1. A method for searching electronic text files, comprising steps of:

providing a plurality of electronic text files;

providing a human interface apparatus for a user to access the plurality of electronic text files;

receiving, at the human interface apparatus, a plurality of M first search terms;

receiving, at the human interface apparatus, a plurality of N second search terms;

receiving a start search command data and, in response, performing the following steps:

(i) performing a key search of the plurality of electronic files and generating a first search term hit list associated with each of the M first search term, the first search term hit list identifying, for each of the M first search terms, the electronic text files from among said plurality of electronic text files having said first search term, (ii) performing a key search of the plurality of electronic files and generating a second search term hit list associated with each of the N second search terms, the second search term hit list identifying, for each of the second search terms, the electronic text files from among said plurality of electronic text files having said second search term, and (iii) identifying M×N unique search term pairs, each search term pair representing one first search term from each of the plurality of M first search terms and one second search term from the plurality of N second search terms; and (iv) generating a plurality of M×N conjunction hit lists, each associated with each key word pair, each conjunction hit list identifying the electronic files from among the plurality of electronic text files having both the first search term and the second search term of the key word pair, and identifying said electronic files' population count.

2. A method according to claim 1 further comprising:

receiving a user-defined search term definition data, said definition data including a search term name and a Boolean expression of language words associated with said search term name;

displaying said search term name; and receiving a user-entered command selecting said displays search term and, in response, assigning the Boolean expression associated with the said search term as one of said first search terms.

3. A method according to claim 1 further comprising steps of receiving a search result format command from the user;

receiving an outline command and, in response generating a visual display of a report outline, the report outline having information formatted for comparison with the information field of one or more of said collection documents;

receiving a report generation command from the user and, in response, generating a report document based on a plurality of said collection documents and formatted in accordance with the report outline.

4. A method for searching electronic files according to claim 1, further comprising:

displaying at least a sub-plurality of said M first search terms along a first region of a display screen, said first region extending in a first direction along said display screen;

displaying at least a sub-plurality of said N second search terms along a second region of a display screen, said second region extending in a second direction along said display screen, displaying, within each of a plurality of regions on said display screen, an indicia representing a corresponding one of said plurality of conjunction hit lists, each region aligned along said first direction with one of said at least a sub-plurality of said M first search terms and aligned along said second direction with one of said at least a sub-plurality of said N second search terms, and the indicia within said region representing the conjunction hit list associated with the said one of said M first search terms and said one of said N second search terms.

5. A method for searching electronic files according to claim 4, further comprising:

receiving a user-entered command identifying one from among said regions;

displaying a representation of at least a sub-plurality of the population of files associated with the conjunction hit list represented by said indicia within said region.

6. A method for searching electronic files according to claim 5, further comprising:

receiving a user-entered file-selection command identifying one from among said population of files associated with the conjunction hit list represented by said indicia within said region, displaying a portion of said file, said portion showing the first search term and the second search term of the key word pair defined by said first search term and said second search term.

7. A method for searching electronic files according to claim 6, further comprising:

receiving a user-entered collection document creation command and, in response, creating a collection file and displaying a content field for entering data into said collection file;

receiving a user-entered text select command and, in response, copying said portion of said file identified by said user-entered file selection command into said content field, and inserting a file selection hyperlink into said content field to be visibly associated with said file from which said portion was copied.

8. A search method comprising:

providing a plurality of electronic text files;

providing a human interface apparatus for receiving search terms and commands from a user, and for accessing and searching said plurality of files in accordance with said data and commands;

receiving, at the human interface apparatus, a first search term;

receiving, at the human interface apparatus, a second search term;

receiving, at the human interface apparatus, a third search term;

receiving, at the human interface apparatus, a fourth search term;

receiving, at the human interface apparatus, a search command;

searching, in response to the search command, the plurality of electronic files and generating a first list, a second list, a third list, a fourth list and a fifth list, said first list identifying each of said electronic files having both the first and third search terms, said second list identifying each of said electronic files having both the first and fourth search terms, a third list, said third list identifying each of said electronic files having both the second and third search terms, and a fourth list, said fourth list identifying each of said electronic files having both the second and fourth search terms;

displaying, on a video display, said first search term, said second search term, said third search term and said fourth search term, a first list identifier representing at least a population count of electronic files within said first list, a second list identifier representing at least a population count of electronic files within said second list, a third list identifier representing at least a population count of electronic files within said third list, and a fourth list identifier representing at least a population count of electronic files within said fourth list.

9. A method according to claim 8, wherein said displaying is performed such that said first list identifier is positioned and aligned according to said displayed first and third search terms, said second list identifier is positioned and aligned according to said displayed first and fourth search terms, said third list identifier is positioned and aligned according to said displayed second and third search terms, and said fourth list identifier is positioned and aligned according to said displayed second and fourth search terms.

* * * * *